(12) United States Patent
Tomoda et al.

(10) Patent No.: US 8,461,073 B2
(45) Date of Patent: Jun. 11, 2013

(54) CATALYST SUPPORT AND METHOD OF PRODUCING SAME

(75) Inventors: Akihiko Tomoda, Shizuoka (JP); Ryou Suzuki, Shizuoka (JP); Shintaro Yagi, Shizuoka (JP)

(73) Assignee: Kabushiki Kaisha F.C.C., Shizuoka (JP)

(*) Notice: Subject to any disclaimer, the term of this patent is extended or adjusted under 35 U.S.C. 154(b) by 160 days.

(21) Appl. No.: 12/860,839

(22) Filed: Aug. 20, 2010

(65) Prior Publication Data

US 2011/0039691 A1 Feb. 17, 2011

Related U.S. Application Data

(63) Continuation of application No. PCT/JP2009/000657, filed on Feb. 18, 2009.

(30) Foreign Application Priority Data

Feb. 21, 2008 (JP) ................. 2008-039704
Aug. 29, 2008 (JP) ................. 2008-222191

(51) Int. Cl.
| | |
|---|---|
| *B01J 23/00* | (2006.01) |
| *B01J 23/10* | (2006.01) |
| *B01J 23/32* | (2006.01) |
| *B01J 23/40* | (2006.01) |
| *B01J 23/42* | (2006.01) |
| *B01J 23/72* | (2006.01) |
| *B01J 23/56* | (2006.01) |
| *B01J 23/44* | (2006.01) |
| *B01J 23/70* | (2006.01) |
| *B01J 23/74* | (2006.01) |
| *B01J 23/20* | (2006.01) |
| *B01J 23/08* | (2006.01) |
| *B01J 21/04* | (2006.01) |
| *B01J 23/02* | (2006.01) |
| *C01F 17/00* | (2006.01) |
| *C01F 7/00* | (2006.01) |

(52) U.S. Cl.
USPC .......... 502/303; 502/324; 502/327; 502/331; 502/332; 502/333; 502/338; 502/339; 502/345; 502/354; 502/355; 502/439; 423/263; 423/600

(58) Field of Classification Search
USPC .............. 423/263, 594.1, 594.5, 594.8, 599, 423/600, 604; 502/303, 324, 325, 327, 331–334, 502/338, 339, 345, 354, 355, 439
See application file for complete search history.

(56) References Cited

U.S. PATENT DOCUMENTS

| | | | | | |
|---|---|---|---|---|---|
| 4,788,174 | A | * | 11/1988 | Arai ............................... | 502/324 |
| 4,959,339 | A | * | 9/1990 | Arai ............................... | 502/302 |
| 5,830,822 | A | * | 11/1998 | Euzen .......................... | 502/355 |
| 5,849,659 | A | * | 12/1998 | Tanaka et al. ................ | 502/324 |
| 5,899,679 | A | * | 5/1999 | Euzen et al. ................. | 431/7 |
| 6,599,493 | B2 | * | 7/2003 | Collins et al. ............... | 423/632 |
| 7,094,730 | B2 | * | 8/2006 | LaBarge et al. .............. | 502/332 |
| 7,105,468 | B2 | * | 9/2006 | LaBarge et al. .............. | 502/328 |
| 7,253,137 | B2 | * | 8/2007 | LaBarge et al. .............. | 502/328 |
| 7,442,669 | B2 | * | 10/2008 | Wickham et al. ............ | 502/303 |
| 7,625,546 | B2 | * | 12/2009 | Delespierre et al. ......... | 423/600 |
| 2004/0110634 | A1 | * | 6/2004 | LaBarge et al. .............. | 502/327 |
| 2006/0258530 | A1 | * | 11/2006 | LaBarge et al. .............. | 502/332 |
| 2007/0111884 | A1 | * | 5/2007 | Chen et al. ................... | 502/303 |
| 2009/0131251 | A1 | * | 5/2009 | Matsueda et al. ............ | 502/303 |
| 2009/0226780 | A1 | * | 9/2009 | Fischer et al. ............... | 429/19 |

FOREIGN PATENT DOCUMENTS

| | | |
|---|---|---|
| JP | 63-020035 | 1/1988 |
| JP | 04-298236 | 10/1992 |
| JP | 05-031367 | 2/1993 |
| JP | 09-271672 | 10/1997 |
| JP | 09-285729 | 11/1997 |
| JP | 10-047610 | 2/1998 |
| JP | 2003-135963 | 5/2003 |

OTHER PUBLICATIONS

Kantcheva et al., "Characterization of LaMnAl11O19 by FT-IR spectroscopy of adsorbed NO and NO/O2", Applied Surface Science 252 (2005) 1481-1491.*

Li et al., "Effect of Magnesium Substitution into LaMnAl11O19 Hexaaluminate on the Activity of Methane Catalytic Combustion", Ind. Eng. Chem. Res. 2008, 47, 1404-1408.*

Kantcheva et al., "Characterization of LaMnAl$_{11}$O$_{19}$ by FT-IR spectroscopy of adsorbed NO and NO/O$_2$," *Applied Surface Science*, 2005, vol. 252, Issue 5, pp. 1481-1491.

Machida, Masato; Eguchi, Koichi; Arai Hiromichi, "Effect of Structural Modification on the Catalytic Property of Mn-Substituted Hexaaluminates", *Journal of Catalysis*, 1990, Issue 123, pp. 477-485, Japan.

Machida, Masato; Eguchi, Koichi; Arai, Hiromichi, "Effect of Additives on the Surface Are of Oxide Supports for Catalytic Combustion", *Academic Press, Inc.*, 1986, Issue 103, pp. 385-393.

International Search Report and Written Opinion for PCT/JP2009/000657 filed Feb. 18, 2009.

\* cited by examiner

*Primary Examiner* — Anthony J Zimmer
(74) *Attorney, Agent, or Firm* — Knobbe, Martens, Olson & Bear, LLP

(57) ABSTRACT

An object of the present invention is to provide a catalyst support which can maintain the purifying ability of HC, CO and NO even after being exposed to a high temperature atmosphere such as about 1000° C. for a long term and a method which can easily produce the catalyst support. According to the present invention there is provided a method for producing a catalyst support of porous alumina formed with pores within which magneto-plumbite type complex oxide ((La.M)$Al_{11}O_{19}$ (wherein M is Mn or Fe)) is formed and a noble metal is supported on the magneto-plumbite type complex oxide comprising an aqueous solution preparing step for preparing aqueous solution containing lanthanum ions and either manganese ions or iron ions; an aqueous solution filling step for filling the pores of porous alumina with the aqueous solution obtained in the aqueous solution preparing step by a pore-filling method using the capillarity caused in the pores; a drying step for drying the porous alumina of which pores are filled with aqueous solution in the aqueous solution filling step, and a burning step for forming the magneto-plumbite type complex oxide by burning the porous alumina obtained in the drying step.

12 Claims, 23 Drawing Sheets

CATALYST SUPPORT AND METHOD OF PRODUCING SAME

CROSS-REFERENCE TO RELATED APPLICATIONS

This application is a continuation of PCT Application No. PCT/JP2009/000657 filed Feb. 18, 2009, which claims priority to Japanese Application No. 2008-039704, filed Feb. 21, 2008 and Japanese Application No. 2008-222191, filed on Aug. 29, 2008, the entire contents of each of which are hereby incorporated by reference.

BACKGROUND OF THE INVENTION

1. Field of the Inventions

The present inventions relate to a catalyst support, and methods of producing the same, having porous alumina formed with pores within which magneto-plumbite type complex oxide (($La.M)Al_{11}O_{19}$ (where M is Mn or Fe)) is formed and a noble metal is supported on the magneto-plumbite type complex oxide, and also relates to a catalyst, a catalyst support, and manufacturing methods thereof, including porous alumina formed with pores within which magneto-plumbite type complex oxide ($La(Mn_x.M_{1-x})Al_{11}O_{19}$ (where M is Co, Cu or Nb)) is formed and a noble metal is supported on the magneto-plumbite type complex oxide.

2. Description of the Related Art

Generally, it is believed that the performance of an emission purifying catalyst may deteriorate as a result of the growth of micro particles of noble metal functioning as catalyst activating components. The micro particles of noble metal are generally distributed on a surface of heat resistant alumina support (catalyst support). However, because these micro particles grow via aggregation after being repeatedly distributed on the alumina surface in accordance with increase of circumference temperature, various technologies have been developed to prevent deterioration of performance of the noble metal catalyst by suppressing the movement or distribution of the noble metal particles on the catalyst surface.

For example, Japanese Laid-open Patent Publication No. 135963/2003 discloses a method for suppressing the movement or distribution of micro particles of noble metal by confining them within pores of an alumina catalyst support. In such a method, it is proposed to prevent aggregation of noble metal particles in pores of the alumina catalyst support by confining oxide particles such as cerium oxide, zirconium oxide, or magnesium oxide simultaneously with the noble metal particles.

Recently, a perovskite-type complex oxide catalyst having a good heat resistance has been disclosed. The perovskite-type complex oxide is usually described as "$ABO_3$" and, in many cases, lanthanum (La) is used as "A" and iron (Fe), cobalt (Co) or manganese (Mn) is used as "B". Although the perovskite type complex oxide catalysts, such as $LaFeO_3$, $LaCoO_3$, and $LaMnO_3$ have emission purifying activity by simply using them, it has been pointed out that they can not treat a sufficient amount of emission and that they are insufficient in NO purifying ability. To overcome these faults, $LaFe_{(1-x)}Pd_xO_3$ has been proposed, which is obtained by replacing part of Fe ions in $LaFeO_3$ with a noble metal (Pd) ions (see Japanese Laid-open Patent Publication No. 31367/1993).

On the other hand, it has been proposed to use, as a catalyst, a magneto-plumbite type complex oxide formed by alumina as its primary ingredient and containing lanthanum (La) as an alkaline earth metal and also proposed in this case to select manganese or iron as a metal atom to be replaced with Al in magneto-plumbite complex. It is supposed that the magneto-plumbite-type complex oxide (hereinafter described as "MPB") has the heat resistance superior to that of the perovskite type complex oxide and it forms a crystal lattice having alumina ($Al_2O_3$) or iron oxide ($Fe_2O_3$) as its primary ingredient and contains alkali metal ions or alkaline earth metal ions within the crystal lattice.

Another technology has been proposed to produce an emission purifying catalyst having a good heat resistance by dipping an MPB described as $AMn_xAl_{(12-x)}O_{19}$ (where A is an alkali metal, an alkaline earth metal or a rare metal) into aqueous solution of noble metallic salt (see Japanese Laid-open Patent Publication No. 271672/1997). According to this prior art, the emission purifying catalyst can be obtained by exactly weighing one molar $La_2O_3$, one molar $Mn_2O_3$ and 11 molar $Al_2O_3$ precursor to synthesize an Mn replaced MPB (($La.Mn)Al_{11}O_{19-x}$) and then by burning it at a temperature higher than 1300° C., preferably at 1450° C. for 5 hours or more.

SUMMARY OF THE INVENTION

However catalysts of the prior art have faults. For example, one catalyst of the prior art using the perovskite-type complex oxide catalyst is not deteriorated in its ability of purifying HC, CO, and NO even after thermal treatments at 900° C. for 100 hours, and thus has been practically used in real vehicles. In recent combustion technologies for performing fuel combustion at higher temperature have been developed in view of improvement of heat efficiency of combustion apparatus. Accordingly, the temperature of exhaust gas has increased and thus the catalysts have to be arranged in the high temperature atmosphere exceeding 900° C. directly below an engine. When catalysts of the prior art are applied to such a high performance combustion apparatus, problems in their heat resistance and durability would be caused.

On the other hand, although it is supposed that catalysts of the prior art using magneto-plumbite type complex oxide (MPB) have an improved heat resistance since the MPB itself is a material having good heat resistance, it is required for synthesizing the Mn replaced MPB (($La.Mn)AL_{11}O_{19-x}$) to exactly weigh one molar $La_2O_3$, one molar $Mn_2O_3$ and 11 molar $Al_2O_3$ precursor and then to burn it at a temperature higher than 1300° C., preferably at 1450° C. for 5 hours or more. This makes the production complicated and increases the production steps, and the specific surface area of obtained Mn replaced MPB is very small (e.g. 10 $m^2$/g or less) and it is difficult to use the obtained MPB as catalyst material.

The applicant has studied a catalyst support using the magneto-plumbite type complex oxide and found that such a catalyst is also desired to have improvements in the low temperature combustion activity for HC and CO as well as in the NO purifying ability under a lean combustion atmosphere.

Therefore, an object of the present invention is to provide a catalyst support which can maintain the purifying ability of HC, CO and NO even after being exposed to a high temperature atmosphere such as about 1000° C., for a long term and a method which can easily produce the catalyst support. It is also an object of the present invention to provide a catalyst or catalyst support which can maintain the purifying ability of HC, CO and NO even after being exposed to a high temperature atmosphere such as about 1000° C. for a long term and can improve the low temperature combustion activity for HC and CO as well as the NO purifying ability under a lean combustion condition and a method which can easily produce the catalyst support.

DETAILED DESCRIPTION OF THE PREFERRED EMBODIMENT

Figure 1:
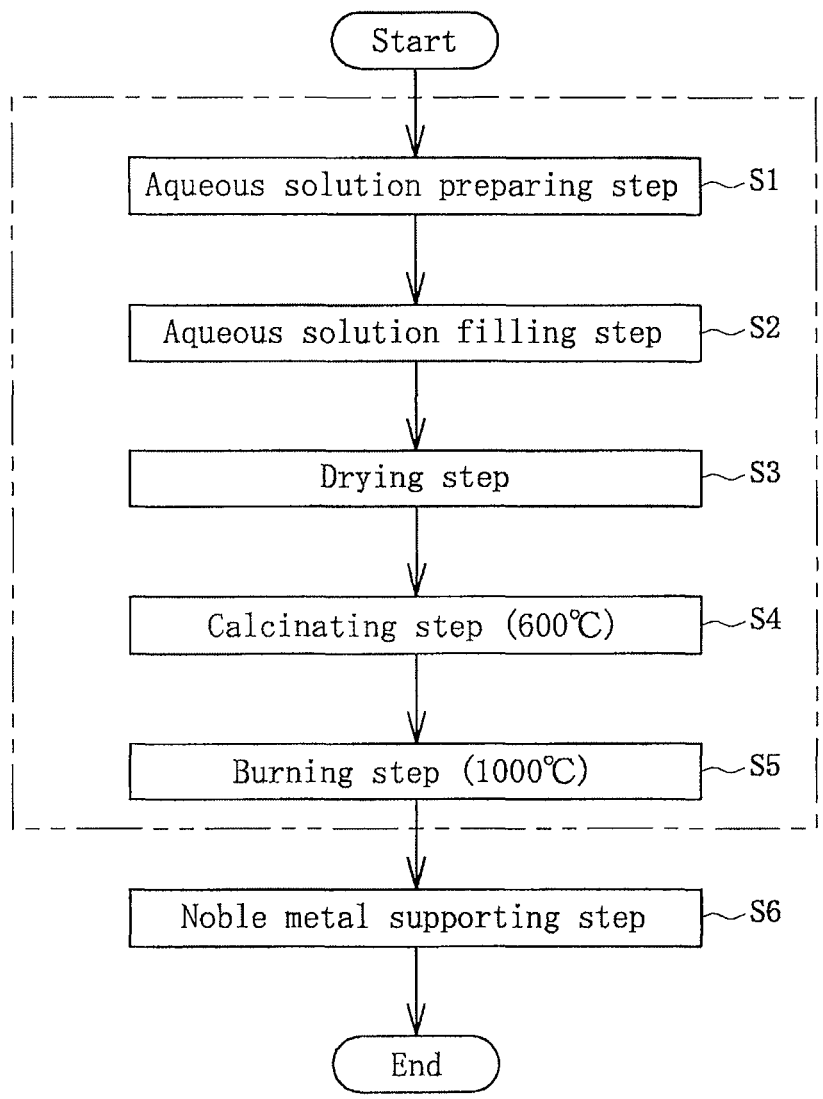
FIG. 1 is a flow chart showing a method for producing a catalyst support according to a first embodiment of the present invention.

For achieving the objects of the present invention, there is provided a method for producing a catalyst support of porous alumina formed with pores within which magneto-plumbite-type complex oxide ((La.M)$Al_{11}O_{19}$ (where M is Mn or Fe)) is formed and a noble metal is supported on the magneto-plumbite-type complex oxide. The method comprises an aqueous solution preparing step for preparing aqueous solution containing lanthanum ions and either manganese ions or iron ions; an aqueous solution filling step for filling the pores of porous alumina with the aqueous solution obtained in the aqueous solution preparing step by a pore-filling method using the capillarity caused in the pores; a drying step for drying the porous alumina of which pores are filled with aqueous solution in the aqueous solution filling step; and a burning step for forming the magneto-plumbite type complex oxide by burning the porous alumina obtained in the drying step.

It is preferable that the aqueous solution obtained in the aqueous solution preparing step is prepared so that the atomic ratio of lanthanum, either manganese or iron, and aluminum is 1:1:11.

It is preferable that the aqueous solution obtained in the aqueous solution preparing step is prepared so that the atomic ratio of lanthanum, either manganese or iron, and aluminum is 1:1:11+x (where "x" is defined as 0<x<10).

It is also preferable that the pores of porous alumina burnt in the burning step are filled with the aqueous solution containing the noble metal by the pore-filling method using the capillarity caused in the pores.

According to the present invention, there is provided a catalyst support of porous alumina formed with pores within which magneto-plumbite-type complex oxide ((La.M)$Al_{11}O_{19}$ (where M is Mn or Fe)) is formed and a noble metal is supported on the magneto-plumbite type complex oxide. The catalyst support is formed by preparing aqueous solution containing lanthanum ions and either manganese ions or iron ions, then by drying the porous alumina after having filled the pores of the porous alumina with aqueous solution with a pore-filling method using the capillarity caused in the pores, and finally by forming the magneto-plumbite type complex oxide with burning the porous alumina in the atmosphere at 1000° C. for more than 60 hours.

It is preferable that the aqueous solution containing the lanthanum ions and either manganese ions or iron ions is prepared so that its atomic ratio of lanthanum, either manganese or iron, and aluminum is 1:1:11.

It is preferable that the aqueous solution containing the lanthanum ions and either manganese ions or iron ions is prepared so that its atomic ratio of lanthanum, either manganese or iron, and aluminum is 1:1:11+x (where "x" is defined as 0<x<10).

It is also preferable that it is formed by filling the pores of porous alumina burnt in the burning step with the aqueous solution containing the noble metal by the pore-filling method using the capillarity caused in the pores.

According to the present invention, there is provided a method for producing a catalyst support of porous alumina formed with pores within which magneto-plumbite-type complex oxide (La($Mn_x.M_{1-x})Al_{11}O_{19}$ (where M is Co, Cu, or Nb)) is formed and a noble metal is supported on the magneto-plumbite type complex oxide. The method comprises an aqueous solution preparing step for preparing aqueous solution containing any one of cobalt ions, copper ions or niobium ions in addition to lanthanum ions and manganese ions; an aqueous solution filling step for filling the pores of porous alumina with the aqueous solution obtained in the aqueous solution preparing step by a pore-filling method using the capillarity caused in the pores; a drying step for drying the porous alumina of which pores are filled with aqueous solution in the aqueous solution filling step, and a burning step for forming the magneto-plumbite type complex oxide by burning the porous alumina obtained in the drying step.

It is preferable that the aqueous solution obtained in the aqueous solution preparing step is prepared so that the atomic ratio of aluminum, lanthanum, manganese, and either cobalt, copper or niobium 11:1:x:1-x (where "x" is defined as 0<x<1).

According to the present invention, there is provided a method for producing a catalyst of porous alumina formed with pores within which magneto-plumbite-type complex oxide $(La(Mn_x.M_{1-x})Al_{11}O_{19}$ (where M is Co, Cu, or Nb)) is formed and a noble metal is supported on the magneto-plumbite type complex oxide. The method comprises an aqueous solution preparing step for preparing aqueous solution containing any one of cobalt ions, copper ions or niobium ions in addition to lanthanum ions and manganese ions; an aqueous solution filling step for filling the pores of porous alumina with the aqueous solution obtained in the aqueous solution preparing step by a pore-filling method using the capillarity caused in the pores; a drying step for drying the porous alumina of which pores are filled with aqueous solution in the aqueous solution filling step; a burning step for forming the magneto-plumbite type complex oxide by burning the porous alumina obtained in the drying step, and a filling step for filling the pores of porous alumina burnt in the burning step with the aqueous solution containing the noble metal with the pore-filling method using the capillarity caused in the pores.

It is preferable that the noble metal is palladium.

According to the present invention, there is provided a catalyst support of porous alumina formed with pores within which magneto-plumbite-type complex oxide $(La(Mn_x.M_{1-x})Al_{11}O_{19}$ (where M is Co, Cu, or Nb)) is formed and a noble metal is supported on the magneto-plumbite type complex oxide where the catalyst support is formed by preparing aqueous solution containing any one of cobalt ions, copper ions or niobium ions in addition to lanthanum ions and manganese ions, then by drying the porous alumina after having filled the pores of the porous alumina with aqueous solution by a pore-filling method using the capillarity caused in the pores, and finally by forming the magneto-plumbite type complex oxide with burning the porous alumina in the atmosphere at 1000° C. for more than 60 hours.

It is preferable that the aqueous solution containing any one of cobalt ions, copper ions, or niobium ions in addition to lanthanum ions and manganese ions is prepared so that its atomic ratio of aluminum, lanthanum, manganese, and either cobalt, copper or niobium is 11:1:x:1–x (where "x" is defined as 0<x<1).

According to the present invention, there is provided a catalyst of porous alumina formed with pores within which magneto-plumbite-type complex oxide $(La(Mn_x.M_{1-x})Al_{11}O_{19}$ (where M is Co, Cu or Nb)) is formed and a noble metal is supported on the magneto-plumbite type complex oxide. The catalyst is formed by preparing aqueous solution containing any one of cobalt ions, copper ions, or niobium ions in addition to lanthanum ions and manganese ions, then by drying the porous alumina after having filled the pores of the porous alumina with aqueous solution by a pore-filling method using the capillarity caused in the pores, then by forming the magneto-plumbite type complex oxide with burning the porous alumina in the atmosphere at 1000° C. for more than 60 hours, and finally by filling the pores of porous alumina burnt in the burning step with the aqueous solution containing the noble metal with the pore-filling method using the capillarity caused in the pores.

It is preferable that the noble metal is palladium.

According to the present invention since the pores of porous alumina are filled with the aqueous solution obtained in the aqueous solution preparing step by a pore-filling method and the magneto-plumbite type complex oxide is precipitated in the pores by burning the porous alumina, it is possible to easily obtain a catalyst support which can maintain the purifying ability of HC, CO and NO even after being exposed to a high temperature atmosphere such as about 1000° C. for a long term.

In addition, it is possible to easily obtain a catalyst support and catalyst which can improve the low temperature combustion activity for HC and CO as well as the NO purifying ability under a lean combustion with use of magneto-plumbite-type complex oxide $(La(Mn_x.M_{1-x})Al_{11}O_{19}$ (where M is Co, Cu, or Nb)) which is formed by adding any one of other metals Co (cobalt), Cu (copper) or Nb (niobium) to (La.Mn)$Al_{11}O_{19}$.

Preferable embodiments of the present invention will be hereinafter described with reference to the drawings.

The catalyst support according to a first embodiment of the present invention comprises porous alumina formed with pores within which magneto-plumbite-type complex oxide $((La.M)Al_{11}O_{19}$ (where M is Mn or Fe)) (i.e., MPB) is formed and on which a noble metal, such as palladium (Pd) is supported. As shown in FIG. 1, the catalyst support is produced through a series of production steps, such as an aqueous solution preparing step S1, an aqueous solution filling step S2, a drying step S3, a calcinating step S4, and a burning step S5 The emission purifying catalyst is produced further through a noble metal supporting step S6.

The aqueous solution preparing step S1 is a step for preparing aqueous solution containing lanthanum (La) ions and either manganese (Mn) ions or iron (Fe) ions (i.e., an aqueous solution containing La ions and Mn ions, or an aqueous solution containing La ions and Fe ions). More particularly, the aqueous solution is prepared so that the atomic ratio of La:M:Al (where M is manganese or iron) is 1:1:11 in mingled aqueous solution of lanthanum salt and manganese salt or of lanthanum salt and iron salt. Preferably, the lanthanum salt is an aqueous solution salt of lanthanum nitrate, lanthanum acetate, lanthanum lactate, etc. The manganese salt is an aqueous solution salt of manganese nitrate, manganese acetate, manganese lactate. etc. The iron salt is an aqueous solution salt of iron nitrate, iron acetate, iron lactate, etc.

The aqueous solution filling step S2 is a step for filling the pores of porous alumina with the aqueous solution obtained in the aqueous solution preparing step S1 by a pore-filling method using the capillarity caused in the pores. The pore-filling method is a method in which a volume of the pores of the alumina support (catalyst support) is measured and the aqueous solution obtained in the aqueous solution preparing step S1 of same amount as the measured volume of the pores is filled in the pores of the alumina support by mingling and stirring the aqueous solution and utilizing the capillarity.

The aqueous solution obtained in the aqueous solution preparing step S1 is an aqueous solution prepared so that the atomic ratio of La:Mn or Fe:Al is 1:1:11, or the atomic ratio of La:Mn or Fe:Al is 1:1:1+x (where x is defined as 0<x<10).

The drying step S3 is a step for drying the porous alumina of which pores are filled with an aqueous solution in the aqueous solution filling step S2. Thus, the walls of pores of the catalyst support are coated by components for forming the magneto-plumbite type complex oxide (MPB). The calcinating step S4 is a step for calcinating the catalyst support dried in the drying step S3, e.g., at about 600° C.

The burning step S5 is a step for further burning the porous alumina obtained in the drying step S3 and calcinated in the step S4 in atmosphere at about 1000° C. to form the magneto-plumbite type complex oxide. The burning duration is 60 hours or more. Such a magneto-plumbite type complex oxide (MPB) forms a crystal lattice having alumina ($Al_2O_3$) or iron oxide ($Fe_2O_3$) as its primary ingredient and contains alkali metal ions or alkaline earth metal ions within the crystal lattice.

The MPB used in the present invention having alumina as its primary ingredient and containing lanthanum as alkaline earth metal is described as $La_2O_3,.11Al_2O_3$ and it is known that part of Al atoms forming the crystal lattice can be easily replaced by other metallic atoms (M) and $(La.M)Al_{11}O_{19}$ can be formed. Especially, when Mn or Fe is used as replaced metal atoms as in the present invention, the catalyst activity is induced in the combustion reaction since the MPB crystal replaced by Mn or Fe has many oxygen defects.

The catalyst support of the present invention can be produced by performing the steps S1-S5 and then the catalyst for purifying emission is produced by performing the noble metal supporting step S6 in which a noble metal (e.g., palladium) is supported on the magneto-plumbite type complex oxide. The noble metal supporting step S6 is a step in which the pores of the catalyst support burnt in the burning step S5 is filled with the aqueous solution containing the noble metal (e.g. palladium) by the pore-filling method using the capillarity caused in the pores. For reducing the manufacturing cost of the catalyst, it is preferable to use palladium as the noble metal, however other noble metals such as platinum (Pt), rhodium (Rh), etc. may be used in place of palladium.

The noble metal supporting step S6 may be modified to a step in which a catalyst support obtained after the step S1-S5 is dipped into nitric acid aqueous solution of palladium nitrate or dinitro-diamine palladium and burnt at 1000° C. after being dried. It has been found that the Mn (or Fe) replaced MPB supported Pd catalyst produced by the method above does not deteriorate its combustion activity for HC and CO and reduction activity for NO, even after the heat resistant examination at 1000° C. for 180 hours.

According to the producing method of the catalyst support above, since the pores of porous alumina are filled with the aqueous solution obtained in the aqueous solution preparing step by a pore-filling method and the magneto-plumbite type complex oxide is precipitated in the pores by drying the porous alumina, it is possible to more easily obtain the catalyst support which can maintain the purifying ability for HC, CO, and NO even after being exposed to a high temperature atmosphere, e.g., about 1000° C. for a long term.

On the other hand, when the aqueous solution is prepared in the aqueous solution preparing step S1 so that the atomic ratio of lanthanum, either manganese or iron, and aluminum is 1:1:11+x (where "x" is defined as 0<x<10), micro crystals of the magneto-plumbite type complex oxide ((La.M)$Al_{11}O_{19}$ (MPB) (where M is Mn or Fe)) is distributed and supported on the walls of pores of the porous catalyst support. Thus, it is possible not only to suppress growth of the MPB micro crystals but to suppress growth of micro particles of the noble metal (Pd) existing on a surface of the MPB.

Next, the results of experiments showing concrete characteristics of the catalyst support and catalyst of the present invention are described here.

(Experiment 1): Synthesis and Characterization of Mn Replaced MPB

After having weighed lanthanum nitrate (La($NO_3$) $3.6H_2O$) of 3.16 g as a precursor of $La_2O_3$ and manganese acetate (Mn ($CH_3CO_2)_2.4H_2O$) of 1.59 g as a precursor of $Mn_2O_3$ and mingled them each other, they were dissolved into distilled water of 3.8 ml. Then, after having filled pores of commercially available alumina (specific surface area: 247 $m^2$/g, pore volume: 0.78 ml/g) of 4.90 g with the mingled aqueous solution by the pore-filling method and dried the alumina in a dryer held at 110° C. for 12 hours, the alumina was burnt at 600° C. for 4 hours and additionally at 1000° C. for 60 hours to obtain synthesized powder of Mn replaced MPB.

It was confirmed that the obtained powder is Mn replaced MPB by XRD (X-ray diffraction) and that the crystal is a columnar grain having the "c"-axis length of about 50-400 nm by a transmission electron microscope (TEM). Values of various physical properties of the synthesized Mn replaced MPB powder were measured by the nitrogen adsorption method at a temperature of liquid nitrogen and as a result of which it was also found that the obtained Mn replaced MPB powder is porous powder having the specific surface area of 61 $m^2$/g and the pore volume of 0.31 ml/g. These results are shown in Table 1. The specific surface area and the pore volume of the alumina used in this experiment after having been burnt at 1000° C. for 60 hours are also shown in Table 1 for comparison. The pore volume is 0.61 ml/g and, accordingly, this suggests that the Mn replaced MPB was formed in alumina pores.

TABLE 1

| Values of various physical properties of Mn replaced MPB powder | | | | |
|---|---|---|---|---|
| | Specific surface area [$m^2$/g] | Pore volume [ml/g] | Pore diameter (adsorption side) [nm] | Pore diameter (desorption side) [nm] |
| Commercially available alumina (fresh) | 201.5 | 0.78 | 15.9 | 13.0 |
| Commercially available alumina (1000° C., 60 hours) | 119.3 | 0.61 | 22.5 | 19.8 |
| Mn replaced MPB (1000° C., 60 hours) | 61.3 | 0.31 | 23.3 | 17.4 |

(Experiment 2): Catalyst Activity of Mn Replaced MPB

After having pressed the Mn replaced MPB prepared in Experiment 1 to pellets and then ground them to powder of 0.25-1.0 mm, the purifying activity was evaluated using powder of 0.5 ml (corresponding to about 0.40 g). Composition of simulated gas used in the activity evaluation was NO: 1000 ppm, CO: 0.80%, $C_3H_8$: 500 ppm, and $O_2$: 0.70%, and the gas flow rate was set at 1 l/min (corresponding to 120,000 $hr^{-1}$ as a space velocity) by using nitrogen as balancing gas.

Figure 2:
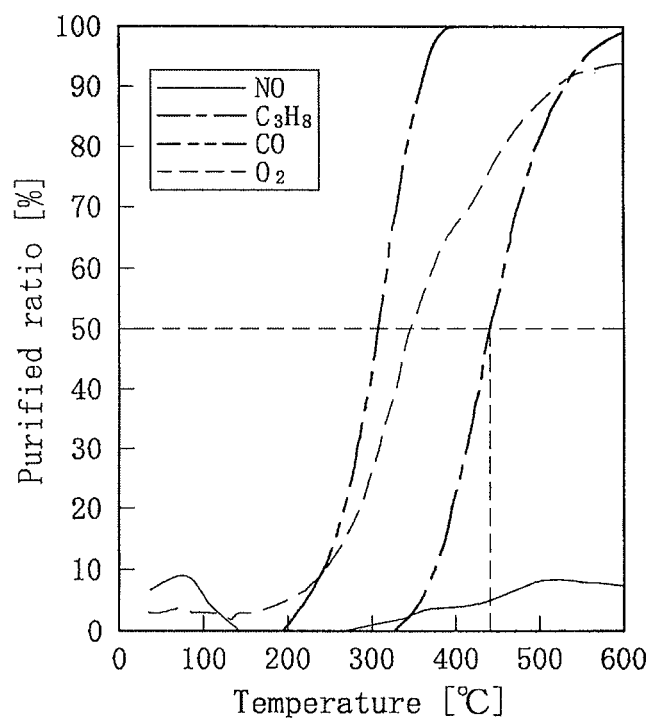
FIG. 2 is a graph showing a behavior of the catalyst activity at each temperature in Experiment 2.

The catalyst activity was evaluated by increasing the temperature of the catalyst layer from its room temperature to 600° C. at a rate of 45° C./min and by measuring the gas composition at an inlet and an outlet of the catalyst layer at each temperature by using the infrared spectroscopy and the magnetic oxygen analyzing method. The behavior of the catalyst activity at each temperature obtained by this experiment is shown in FIG. 2. It can be appreciated from FIG. 2 that although the purifying activity for NO, CO, and HC can be obtained merely by the Mn replaced MPB, the purified ratio for NO and HC at 400° C. is low and thus it is still insufficient for practical use.

(Experiment 3): Preparation of 3.8 wt % Palladium Catalyst Supporting Mn Replaced MPB The Mn replaced MPB powder of 3.0 g obtained in Experiment 1 was weighed and its pores were filled with Pd.dinitro-diamine aqueous solution of 0.9 ml by the pore-filling method. Although the commercially available Pd.dinitro-diamine aqueous solution used in this experiment contained 4.6 wt % palladium, the Pd.dinitro-diamine aqueous solution of 2.6 ml (including Pd of 0.119 g) was condensed to 0.9 ml on a water bath and was used for the pore-filling.

After having dried the pore-filled powder in a dryer for 12 hours, it was burnt at 600° C. for 4 hours and additionally at 1000° C. for 10 hours to obtain the palladium catalyst supporting Mn replaced MPB (hereinafter sometimes simply described as "Mn.MPB"). By an observation using TEM, it was confirmed that the size of a palladium particle is 5-10 nm.

Figure 3:
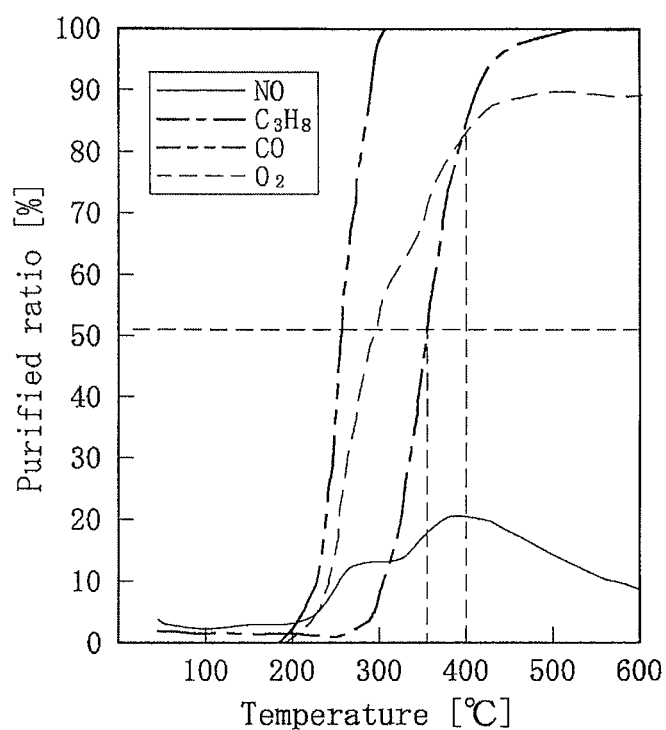
FIG. 3 is a graph showing results of evaluation of the purifying activity of catalyst in Experiment 4.

(Experiment 4): Activity Evaluation of 3.8 Wt % Palladium Catalyst Supporting Mn Replaced MPB After having formed the 3.8% Pd/Mn.MPB catalyst prepared in Experiment 3 to pellets and then ground them to powder of 0.25-1.0 mm, the purifying activity was evaluated using powder of 0.5 ml (corresponding to about 0.40 g) under same conditions as in Experiment 2 and the results of which are shown in FIG. 3. The activity and deterioration of catalyst were evaluated by reading the temperature at which the purified ratio of $C_3H_8$ reached to 50% as T 50 (HC) from FIG. 3 and by using the purified ratios (Table 2) respectively of HC, CO, and NO.

Figure 4:
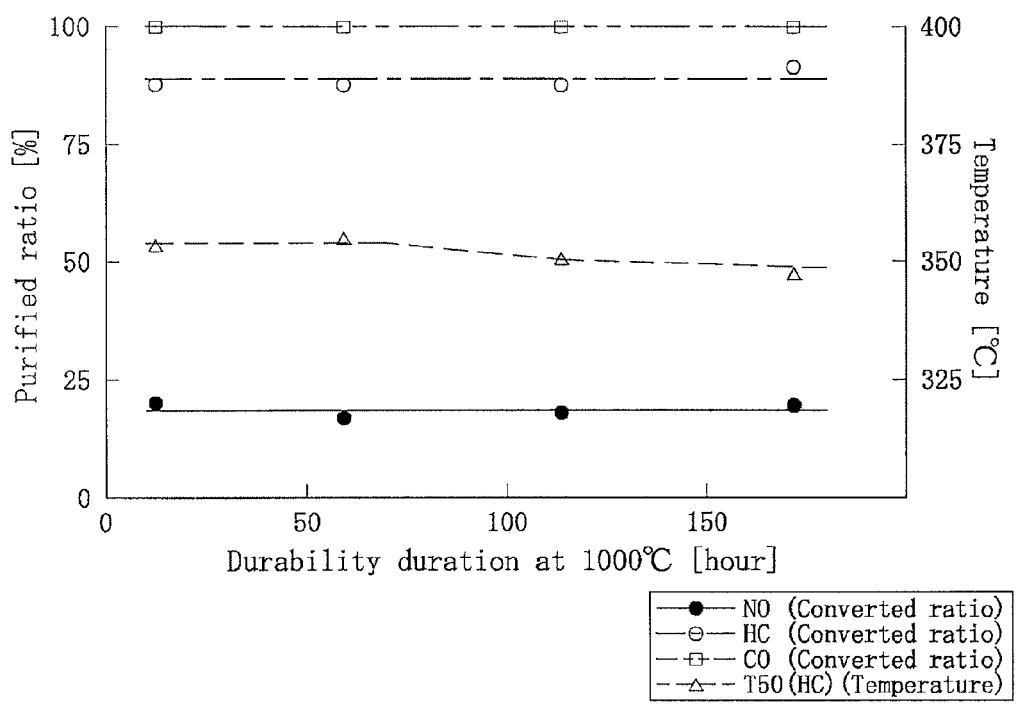
FIG. 4 is a graph showing variations of purified ratio of HC, CO and NO in Experiment 5.

FIG. 4. It is found from FIG. 4 that the 3.8% Pd/Mn.MPB catalyst produced according to the present invention is excellent in its heat resistance.

(Experiment 6): Variation of Pd Particle Diameter of 3.8% Pd/Mn.MPB Catalyst After the Heat Resistant Experiment It was shown in Experiment 5 that no variation is found in the purifying ability of the 3.8% Pd/Mn.MPB catalyst for NO, CO, and HC even after burning at 1000° C. for 180 hours. In order to find out its reasons, inventors of the present invention noticed the growth of Pd particles in this experiment and observed the size of the Pd particles after burning at 1000° C. for 10 and 180 hours using a transmission electron microscope (TEM). As a result, the size of particles was 5-10 nm and thus, no particle growth was observed. In general, since the growth of Pd particles induces deterioration of the activity of catalyst, it is supposed that the fact of no particle growth after burning for 180 hours is a main reason of achievement of the catalyst that is excellent in the heat resistance.

Experiment 7 Variation of Catalyst Activity According to Variation of Oxygen Concentration in Simulated Emission Gas The oxygen concentration of emission gas of an automobile varies in accordance with combustion conditions of gasoline. High oxygen concentration emission is called as "lean" and low oxygen concentration emission is called as "rich" and the purifying performance of catalyst varies in accordance with conditions of the oxygen concentration. The simulated emission gas composition used in Experiments 2 and 4 is lean emission having a slightly higher oxygen concentration than the stoichiometric combustion emission in the theoretical air fuel ratio (weight ratio (14.6)) of air and fuel used in combustion).

In this experiment, three kinds of emissions, i.e., simulated emission of higher oxygen concentration ($O_2$:0.77%), simulated emission of slightly lower oxygen concentration ($O_2$: 0.63% and 0.59%) and stoichiometric emission in the theoretical air fuel ratio ($O_2$:0.65%) were used and variations of catalyst activities under respective conditions were observed.

TABLE 2

Evaluation of activity and heat resistance of 3.8% Pd/Mn•MPB catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 354 | 87 | 100 | 20 | 100 | 100 | 15 |
| 60 | 356 | 85 | 100 | 25 | 98 | 100 | 18 |
| 120 | 350 | 85 | 100 | 20 | 100 | 100 | 12 |
| 180 | 348 | 90 | 100 | 23 | 100 | 100 | 12 |

(Experiment 5): Heat Resistance of 3.8% Pd/Mn.MPB Catalyst

After having heated and burnt the 3.8% Pd/Mn.MPB catalyst used in Experiment 4 at 1000° C. for 60 hours, and additionally for 120 hours and 180 hours, the purifying activity was evaluated using the same method as that used in Experiment 2 and the heat resistance of the catalyst of the present invention was evaluated. The results of the experiment are shown in Table 2 together with the results of Experiment 3. Little temperature variation of T 50 (HC) is found near 350° C. after burning at 1000° C. for 60, 120 and 180 hours, and substantial variation is not found in the purified ratio at 400 and 500° C. of HC, CO and NO. This is shown in The 3.8% Pd/Mn.MPB catalyst after burning for 120 hours used in Experiment 5 was also used in this experiment.

Figure 5:
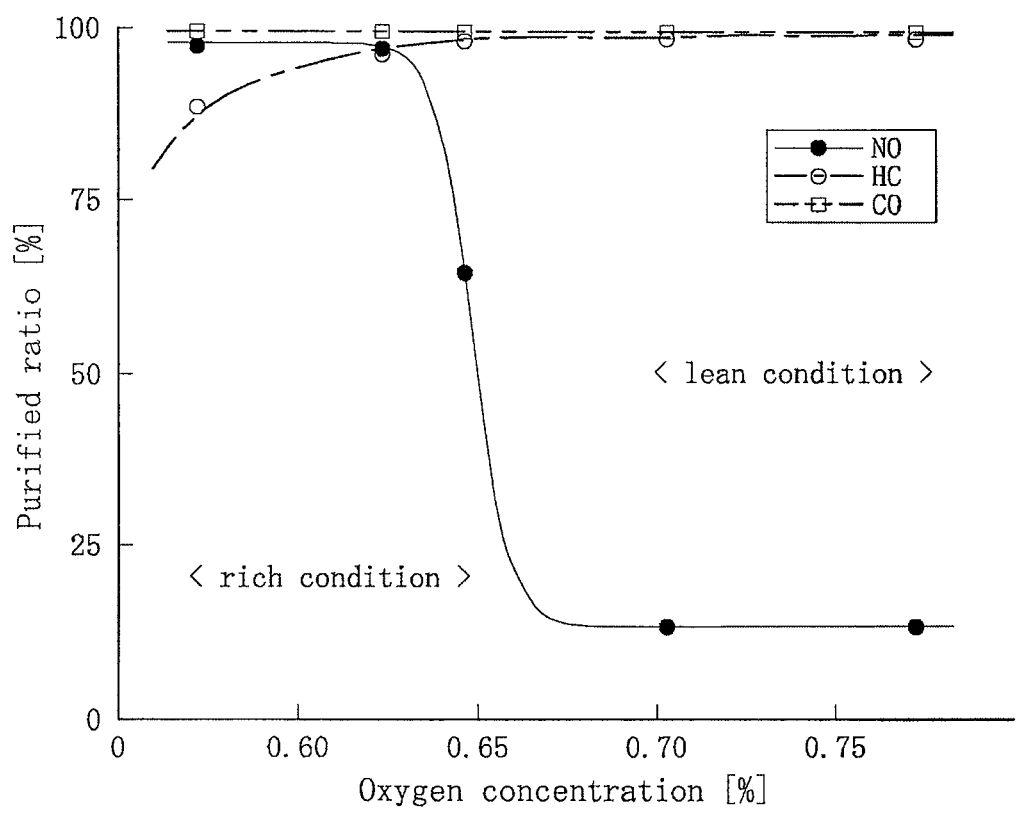
FIG. 5 is a graph showing results of Experiment 7 shown in Table 3.

The evaluation of activity was carried out similarly to Experiments 2 and 3 and the purified ratios of HC, CO, and NO at T 50 (HC) and 500° C. were compared with each other (see Table 3). The results shown in Table 3 are shown in a graph of FIG. 5. It is found from FIG. 5 that the purified ratio of NO at 500° C. can be improved to near 90% when the oxygen concentration becomes lower than 0.65%. That is, it is possible to remarkably improve the purified ratio of NO when the oxygen concentration in emission gas is lowered without greatly reducing the purified ratio of HC and CO although it was supposed that the catalyst of the present invention is somewhat worse in the purifying performance.

TABLE 3

Variations of catalyst activity when oxygen concentration in emission is varied

| Oxygen concentration in emission [%] | T50 (HC) [° C.] | HC purified ratio [%] | CO purified ratio [%] | NO purified ratio [%] |
|---|---|---|---|---|
| | | Activity at 500° C. | | |
| 0.77 | 377 | 100 | 100 | 10 |
| 0.70 | 353 | 100 | 100 | 12 |
| 0.65 | 392 | 97 | 100 | 65 |
| 0.63 | 370 | 97 | 100 | 99 |
| 0.59 | 425 | 80 | 100 | 97 |

(Experiment 8): Optimization of Pd Supporting Amount in the Pd/Mn.MPB Catalyst

Similarly to the method of Experiment 1, the pores of alumina were filled with mingled aqueous solution of manganese acetate (Mn (CH$_3$CO$_2$)$_2$.4H$_2$O) and lanthanum nitrate (La(NO$_3$)$_3$.6H$_2$O) and burnt for 4 hours after drying at 600° C. and additionally burnt at 1000° C. for 10 hours to prepare Mn.MPB powder. Then, similarly to the method of Experiment 3, palladium (Pd) was supported on the Mn.MPB powder to prepare Mn.MPB catalysts of 1% Pd, 2% Pd, 3.3% Pd, and 5% Pd.

Figure 6:
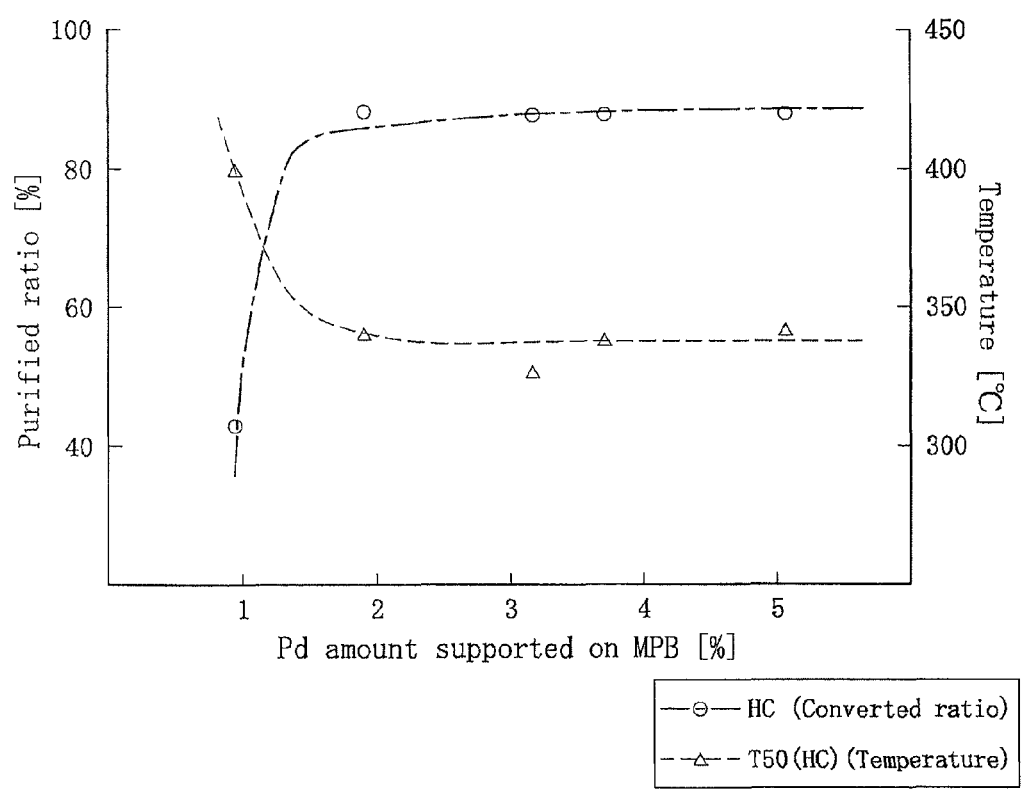
FIG. 6 is a graph showing HC combustion activity of a catalyst after a durability test at 1000° C. for 120 hours.

After having burnt these catalysts at 1000° C. for 10, 60, and 120 or 180 hours, the catalyst activity was measured similarly to the method of Experiment 2 to optimize the supporting amount of Pd and evaluated the heat resistance of them. These results are shown in Tables 4-7 and FIG. 6 shows a relation between the HC combustion activity obtained using catalysts burnt at 1000° C. for 120 hours and the Pd amount supported on the MPB. It was concluded that the activity is insufficient at a supported amount less than 1% and the activity is saturated at a supported amount exceeding 5% and thus, the optimum supported amount of Pd is in a range of 2-4%.

TABLE 4

Evaluation of activity and heat resistance of 1% Pd/Mn•MPB catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 402 | 50 | 100 | 14 | 88 | 100 | 8 |
| 60 | 389 | 62 | 100 | 16 | 92 | 100 | 8 |
| 120 | 404 | 47 | 100 | 15 | 87 | 100 | 11 |

TABLE 5

Evaluation of activity and heat resistance of 2% Pd/Mn•MPB catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 384 | 65 | 100 | 18 | 95 | 100 | 12 |
| 60 | 361 | 80 | 100 | 16 | 95 | 100 | 10 |
| 120 | 350 | 90 | 100 | 20 | 99 | 100 | 11 |

TABLE 6

Evaluation of activity and heat resistance of 3.3% Pd/Mn•MPB catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 359 | 80 | 100 | 19 | 96 | 100 | 10 |
| 60 | 364 | 75 | 100 | 18 | 90 | 100 | 8 |
| 120 | 335 | 85 | 100 | 18 | 100 | 100 | 10 |
| 180 | 361 | 80 | 100 | 22 | 95 | 100 | 15 |

TABLE 7

Evaluation of activity and heat resistance of 5% Pd/Mn•MPB catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 374 | 65 | 100 | 16 | 95 | 100 | 8 |
| 60 | 345 | 90 | 100 | 19 | 98 | 100 | 11 |
| 120 | 351 | 85 | 100 | 21 | 98 | 100 | 18 |

(Experiment 9): Preparation of Alumina on which Pd/Mn-.MPB Catalyst is Distributed It has been described above the catalyst activity and heat resistance relating to the catalyst formed by supporting Pd on the Mn replaced MPB ((La.Mn)Al$_{11}$O$_{19}$) prepared in Experiment 1. However it is possible to prepare a catalyst support comprising alumina on which Mn.MPB is distributed and supported by increasing an amount of alumina without changing an amount of lanthanum nitrate (La(NO$_3$)$_3$.6H$_2$O) and manganese acetate (Mn(CH$_3$CO$_2$)$_2$.4H$_2$O) used in Experiment 1.

In this experiment, various kinds of alumina bodies were produced on which the Mn.MPB is distributed and supported at various rates and then 3.0% Pd/Mn.MPB/alumina catalyst was prepared to evaluate the catalyst activity. The object of this experiment is to optimize an amount of the Mn replaced MPB (Mn.MPB) to be distributed and supported on the alumina. In particular, lanthanum nitrate of 1.82 g and manganese acetate of 0.94 g were dissolved into distilled water of 3.1 ml and then filled alumina of 4.0 g with this aqueous solution. Then, after having dried the alumina at 110° C. for 12 hours, the alumina was burnt at 600° C. for 4 hours and additionally at 1000° C. for 10 hours to obtain synthesized alumina powder (30 mol % Mn.MPB/Al$_2$O$_3$) on which 30 mol % replaced MPB powder is distributed. The pore volume of the synthesized 30 mol % Mn.MPB/Al$_2$O$_3$ was 0.46 ml/g (see Table 8 below).

This synthesized powder of 3.0 g was weighed and its pores were filled with Pd.dinitro-diamine aqueous solution of 1.3 ml by the pore-filling method. Although the commercially available Pd.dinitro-diamine aqueous solution used in this experiment contained 4.6 wt % palladium, the Pd.dinitro-diamine aqueous solution of 2.1 ml (including Pd of 0.094 g) was condensed to 1.3 ml on a water bath and was used for the pore-filling. After having dried the pore-filled powder in a dryer for 12 hours, it was burnt at 600° C. for 4 hours and additionally at 1000° C. for 10 hours to obtain 3% palladium catalyst supporting Mn replaced MPB (hereinafter described as "3% Pd/30 mol % MPB/Al$_2$O$_3$"). This catalyst was submitted to the heat resistant examination after having been burnt at 1000° C. for 60 hours, 120 hours, and additionally 180 hours.

(Experiment 10): Structural Change of the 3% Pd/30 mol % Mn.MPB/Al$_2$O$_3$ Catalyst According to the 1000° C. Burning Behavior of utilization of the alumina pores in the pore-filling method were studied in each step related to preparation of the 30 mol % Mn.MPB/Al$_2$O$_3$ catalyst and 3% Pd/30 mol % Mn.MPB/Al$_2$O$_3$ catalyst described in Experiment 9 by measuring changes of the pore volume of samples. The results are shown in Table 8 below.

TABLE 8

Change of alumina pore volume according to pore-filling method

| Sample | Specific surface area [m$^2$/g] | Pore volume [ml/g] |
|---|---|---|
| Commercially available alumina | 201.5 | 0.78 |
| Alumina after burning at 1000° C. for 10 hours | 141.5 | 0.67 |
| Alumina after burning at 1000° C. for 60 hours | 119.3 | 0.61 |
| 30 mol % MPB/Al$_2$O$_3$ after burning at 1000° C. for 10 hours | 94.9 | 0.46 |
| 3% Pd/30 mol % MPB/Al$_2$O$_3$ after burning at 1000° C. for 10 hours | 71.5 | 0.32 |
| 3% Pd/30 mol % MPB/Al$_2$O$_3$ after burning at 1000° C. for 60 hours | 35.8 | 0.16 |

From Table 8, it is possible to confirm the formation of Mn replaced MPB (Mn.MPB) crystals in the alumina pores and behavior of change of pore volume according to precipitation of palladium particles. It is also shown in Table 8 the volume of pores when only alumina is burnt at 1000° C. for 60 hours for comparison. In the 3% Pd/30 mol % MPB/Al$_2$O$_3$ after burning at 1000° C. for 10 hours, formation of not only magneto-plumbite (Mn.MPB) crystals but perovskite (LaAlO$_3$) crystals are observed. However, it is observed that nearly all is magneto-plumbite (Mn.MPB) crystals after burning of 60 hours.

Figure 7:
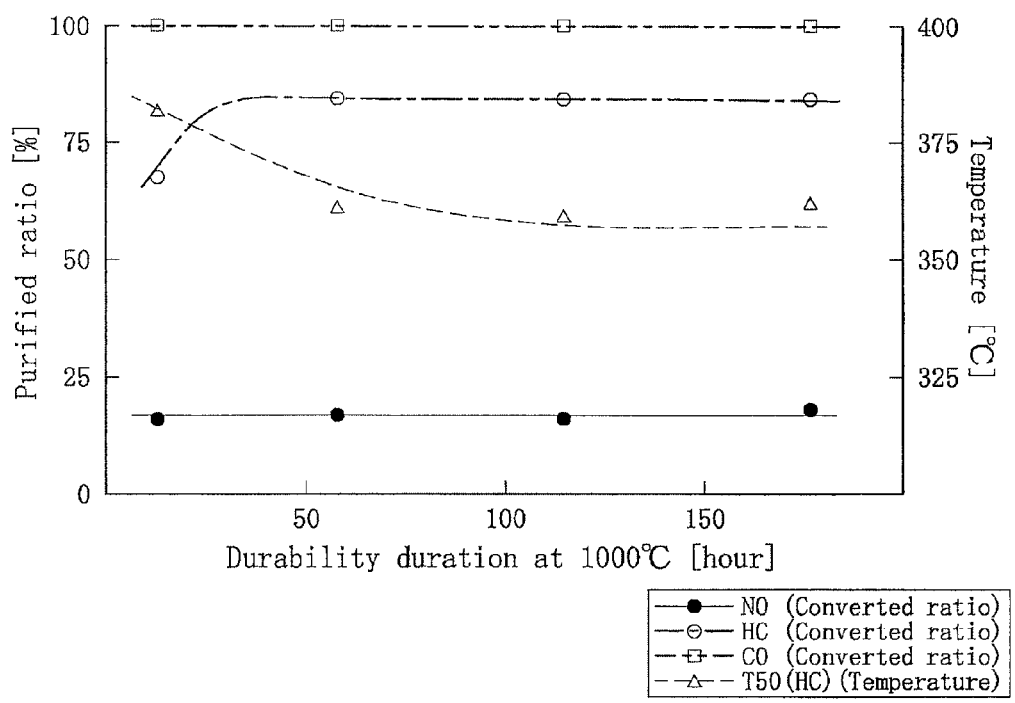
FIG. 7 is a graph showing durability of purifying performance of 3% Pd/30 mol % MPB/$Al_2O_3$ at 400° C.

Experiment 11: Evaluation of the Catalyst Activity and Heat Resistance of Alumina on which 3% Pd/Mn.MPB Catalyst is Distributed The catalyst activity and heat resistance were evaluated similarly to the method of Experiment 2 using the catalyst prepared in Experiment 9. After having burnt these catalysts in atmosphere at 1000° C. for 60, 120, and 180 hours, the catalyst activity and heat resistance were measured similarly to the method of Experiment 5. These results are shown in Tables 10 (below) and FIG. 7. It was confirmed that deterioration is not observed in the purified ratio of NO, CO, and HC at the 50% purified temperature (T50 (HC)) and 400° C. even after burning for 180 hours and its original activity is maintained.

(Experiment 12): TEM Observation of the Structure and Pd Particles of the 3% Pd/30 mol % MPB/Al$_2$O$_3$ Catalyst From the results shown in FIG. 7, although the catalyst burnt for 10 hours is unstable in the HC combustion activity and the T (50) HC is also slightly high, those burnt for 60 or 120 hours are stable in the HC combustion activity and also stable in the T (50) HC near 360° C. For studying this cause, the change in catalyst structure after burning for 60 hours was observed and the size of Pd particles was observed by a TEM.

As previously described, not only the MPB structure but the perovskite (LaAlO$_3$) structure are observed in catalysts burnt for 10 hours, however it was confirmed that almost all is the MPB structure in those burnt for 60 hours. It is supposed that this is a reason for the stability of HC combustion activity after 60 hour burning of catalyst. From the observation of the size of Pd particles, no growth of Pd particles can be observed since the particle size was 5-10 nm also in the catalyst burnt for 60 hours. It is supposed that this is a reason of maintaining a high purified ratio without causing reduction of purifying activity of HC, CO, and NO also in those burnt for 180 hours.

Experiment 13: Evaluation of the Catalyst Activity and Heat Resistance of 3 wt % Pd/x mol % MPB/Alumina The molar fraction (mol %) of Mn.MPB distributed on alumina was changed to 15, 50, and 75% by changing an amount of alumina used in Experiment 9. Then Pd of 3 wt % was supported on the alumina on which the Mn.MPB is distributed similarly to Experiment 9 (hereinafter simply described as "3 wt % Pd/x mol % MPB/alumina": x=15, 50, or 75). The catalyst activity and heat resistance were evaluated using respective catalysts similarly to Experiment 2 and the results are shown in Tables 9-12.

TABLE 9

Evaluation of activity and heat resistance of 3% Pd/15 mol % Mn•MPB/alumina catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 400 | 60 | 100 | 15 | 90 | 100 | 10 |
| 60 | 385 | 65 | 100 | 16 | 95 | 100 | 13 |
| 120 | 356 | 85 | 100 | 16 | 98 | 100 | 10 |
| 180 | 374 | 75 | 100 | 13 | 95 | 100 | 10 |

TABLE 10

Evaluation of activity and heat resistance of 3% Pd/30 mol % Mn•MPB alumina catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 382 | 70 | 100 | 18 | 95 | 100 | 12 |
| 60 | 360 | 85 | 100 | 20 | 100 | 100 | 12 |
| 120 | 361 | 85 | 100 | 18 | 100 | 100 | 12 |
| 180 | 367 | 78 | 100 | 18 | 95 | 100 | 18 |

TABLE 11

Evaluation of activity and heat resistance of 3% Pd/50 mol % Mn•MPB/alumina catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 384 | 68 | 100 | 15 | 98 | 100 | 10 |
| 60 | 373 | 75 | 100 | 13 | 98 | 100 | 10 |
| 120 | 353 | 85 | 100 | 16 | 96 | 100 | 7 |

TABLE 12

Evaluation of activity and heat resistance of 3% Pd/75 mol % Mn•MPB/alumina catalyst

| 1000° C. burning duration [hour] | T50 (HC) [° C.] | Activity at 400° C. | | | Activity at 500° C. | | |
|---|---|---|---|---|---|---|---|
| | | HC purified ratio [%] | CO purified ratio [%] | NO purified ratio [%] | HC purified ratio [%] | CO purified ratio [%] | NO purified ratio [%] |
| 10 | 370 | 75 | 100 | 18 | 95 | 100 | 8 |
| 60 | 392 | 60 | 100 | 15 | 87 | 100 | 10 |
| 120 | 360 | 76 | 100 | 17 | 92 | 100 | 9 |

Figure 8:
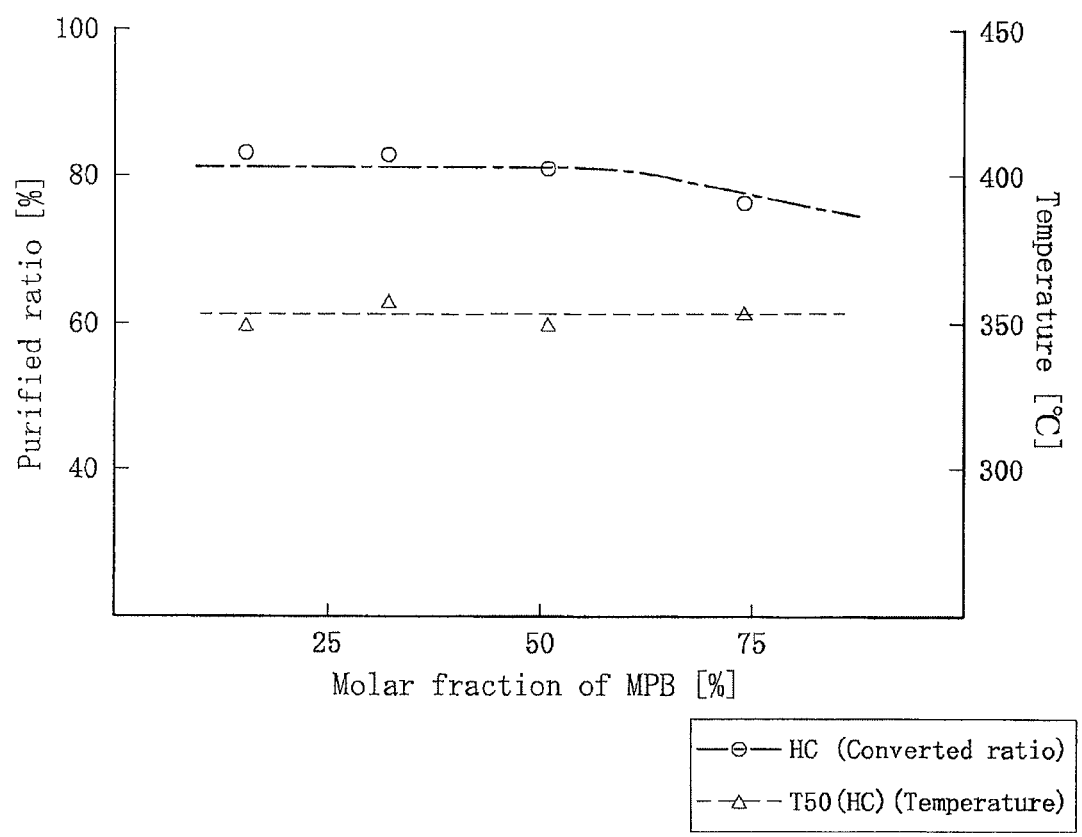
FIG. 8 is a graph showing HC combustion activity of 3% Pd/x mol % Mn-MPB/$Al_2O_3$ after a durability test.

The HC combustion activity and T50(HC) obtained from the durability examination after burning at 1000° C. for 120 hours were plotted against the molar fraction of MPB to obtain a graph of FIG. 8. From this graph, it is possible to confirm that the 3 wt % Pd/x mol % MPB/alumina catalyst is a catalyst becomes excellent in the heat resistance if the molar fraction of MPB is 15% or more.

Experiment 14: Synthesis of Fe Replaced MPB and Catalyst Activity of 3% Pd/Fe.MPB After having weighed lanthanum nitrate (La(NO$_3$)$_3$.6H$_2$O) of 3.16 g as a precursor of La$_2$O$_3$ and iron acetate (Fe (CH$_3$CO$_2$)$_2$) of 1.39 g as a precursor of Fe$_2$O$_3$ and mingled them each other, they were dissolved into distilled water of 3.8 ml. Then after having filled pores of commercially available alumina (specific surface area: 247 m$^2$/g, pore volume: 0.78 ml/g) of 4.90 g with the mingled aqueous solution by the pore-filling method and dried the alumina in a dryer held at 110° C. for 12 hours, the alumina was burnt at 600° C. for 4 hours and additionally at 1000° C. for 10 hours to obtain synthesized powder of Fe replaced MPB (hereinafter simply described as "Fe.MPB")

Figure 9:
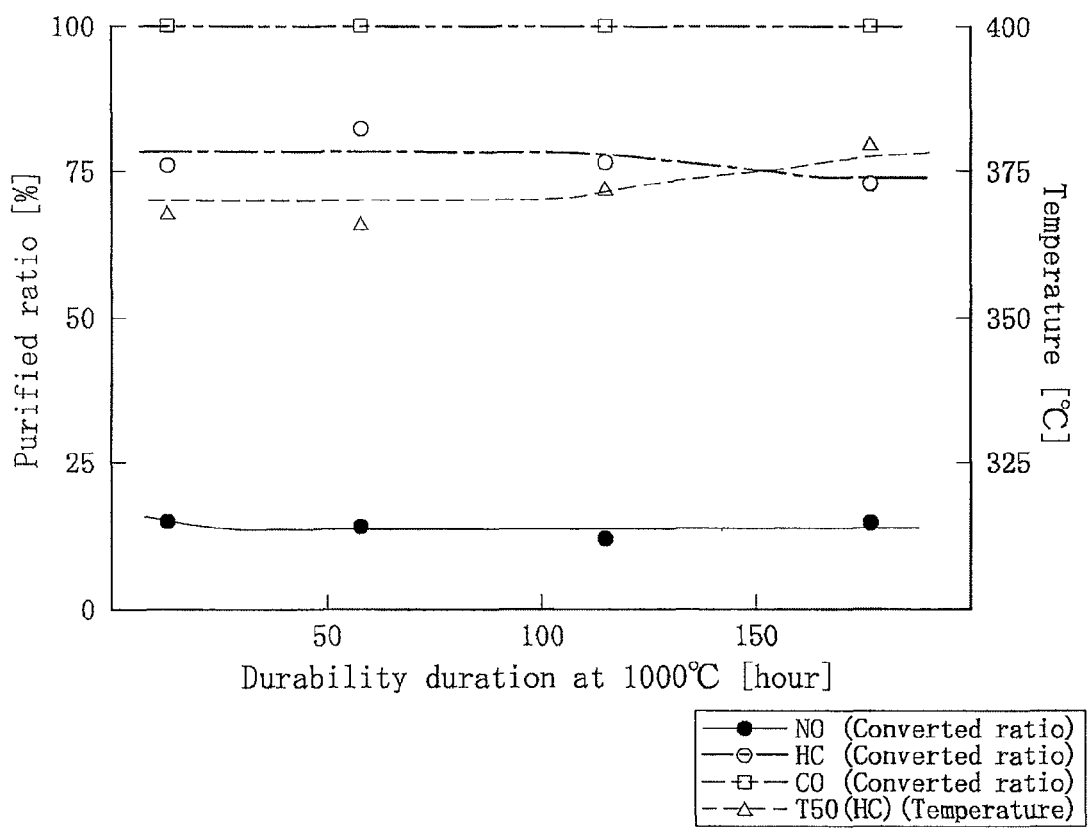
FIG. 9 is a graph showing a durability of purifying performance of 3% Pd/Fe.MPB at 400° C.

A 3 wt % Pd was supported on the Fe.MPB powder using a method similar to Experiment 3 to produce 3% Pd/Fe.MPB. The catalyst activity and heat resistance were evaluated according to the method of Experiment 2 after having burnt these catalysts at 1000° C. for 10, 60, 120, and 180 hours. These results are shown in Table 13 and FIG. 9. It was confirmed that the Fe.MPB catalyst supporting 3% Pd is, similarly to 3% Pd/Mn.MPB, a catalyst that is very excellent in the heat resistance.

TABLE 13

Evaluation of activity and heat resistance of 3% Pd/Fe•MPB alumina catalyst

| 1000° C. | | Activity at 400° C. | | | Activity at 500° C. | | |
|---|---|---|---|---|---|---|---|
| burning duration [hour] | T50 (HC) [° C.] | HC purified ratio [%] | CO purified ratio [%] | NO purified ratio [%] | HC purified ratio [%] | CO purified ratio [%] | NO purified ratio [%] |
| 10 | 367 | 75 | 100 | 15 | 95 | 100 | 8 |
| 60 | 362 | 80 | 100 | 12 | 97 | 100 | 5 |
| 120 | 372 | 75 | 100 | 10 | 95 | 100 | 8 |
| 180 | 385 | 70 | 100 | 12 | 97 | 100 | 7 |

(Experiment 15)

The state of existence of Pd before and after the reaction of 3.8% Pd/Mn.MPB evaluated as to the activity in Experiment 4 was observed by an EXAFS (extended X-ray absorption fine structure). Since the EXAFS can clear a local structure around a targeted atom, it was observed whether Pd exists as metallic particles or as oxide particles (PdO). In this experiment, a laboratory EXAFS having a strong x-ray generating apparatus as a radiation source and Ge (660) and graphite as spectrocrystals was used.

Figure 10:
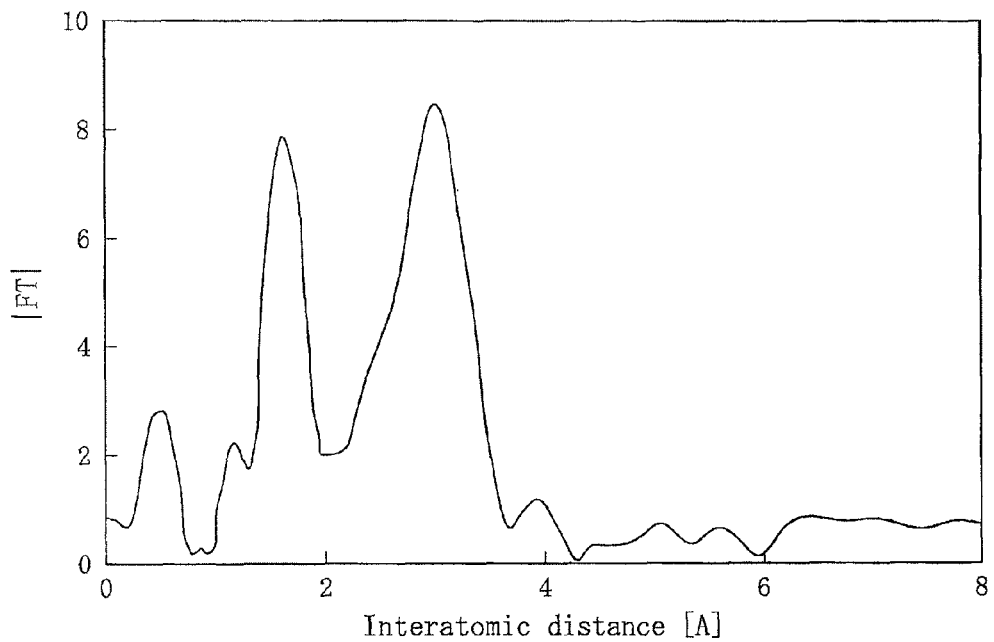
FIG. 10 is a graph showing EXAFS Fourier spectrum of palladium oxide (PdO) standard sample in Experiment 15.
Figure 11:
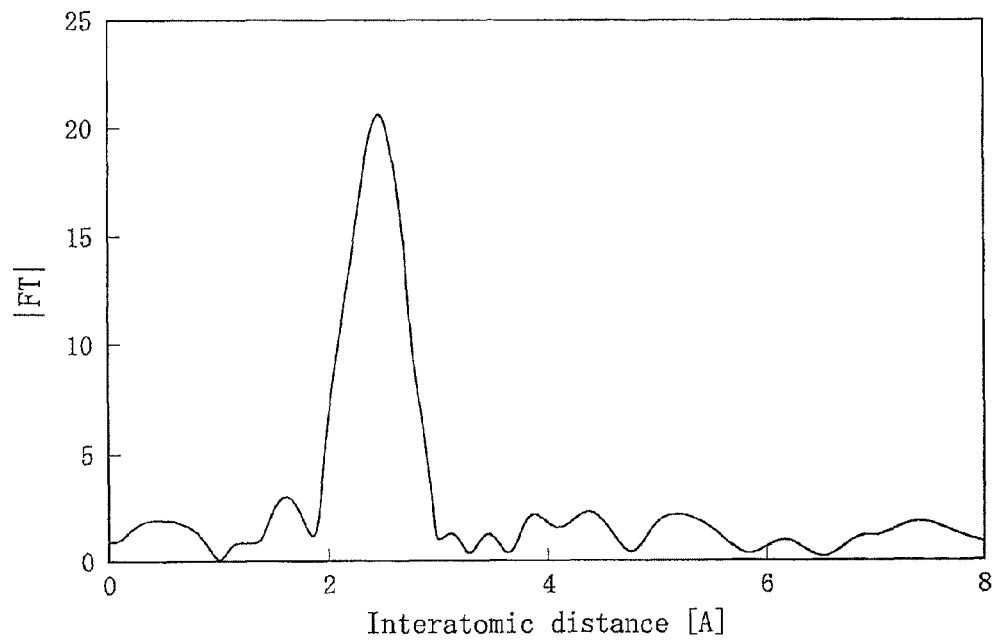
FIG. 11 is a graph showing EXAFS Fourier spectrum of palladium metal (Pd foil) standard sample in Experiment 15.
Figure 12:
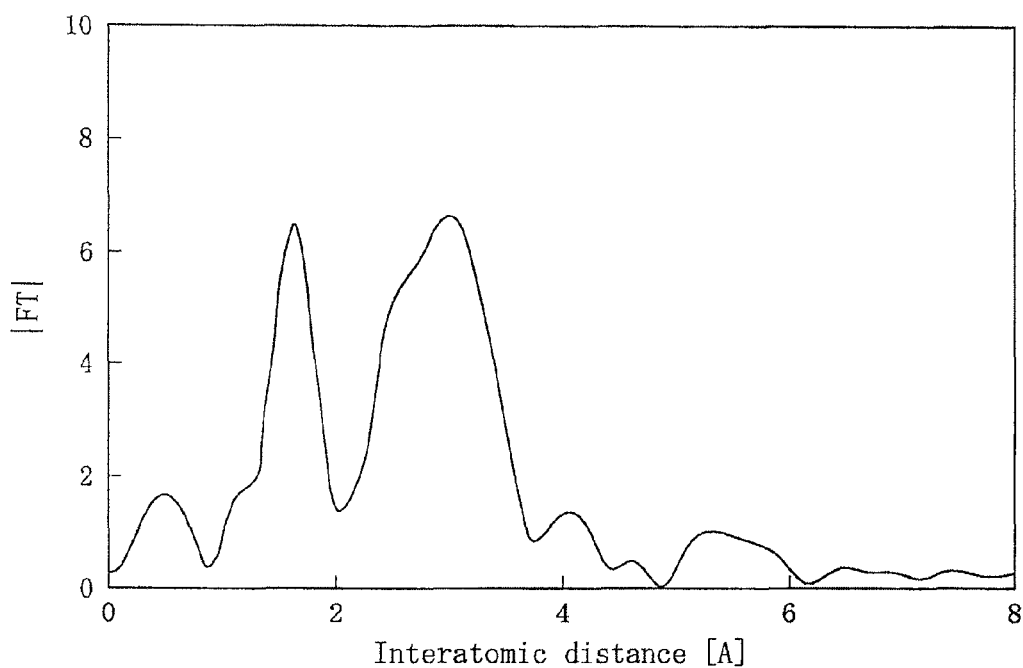
FIG. 12 is a graph showing EXAFS Fourier spectrum of a catalyst before a evaluation reaction in Experiment 15.
Figure 13:
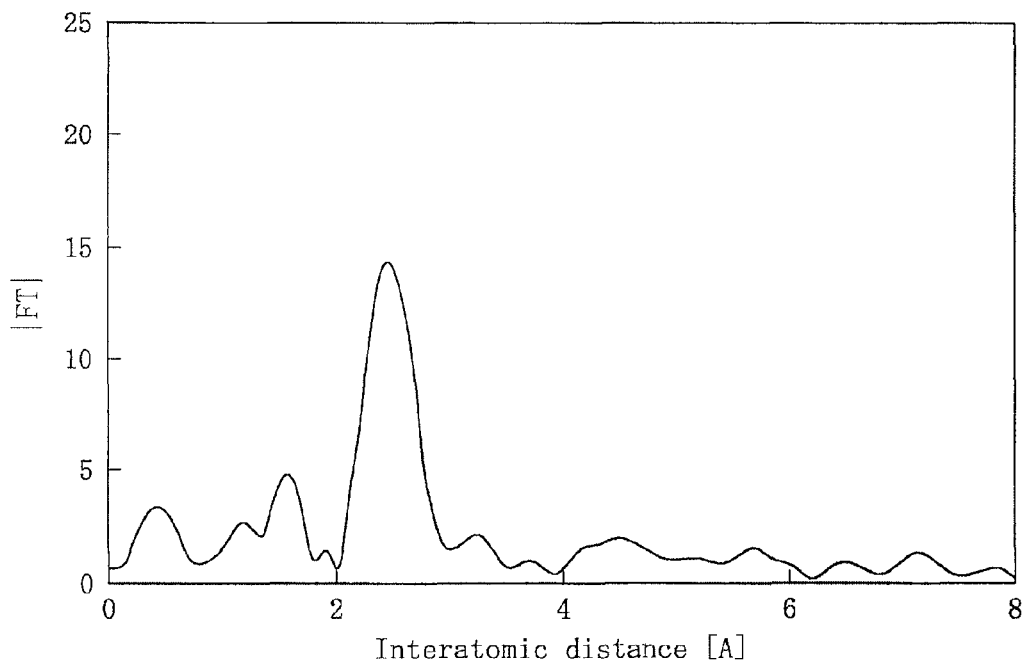
FIG. 13 is a graph showing EXAFS Fourier spectrum of a catalyst after a evaluation reaction in Experiment 15.

The catalyst powder as a sample was ground and about 0.5 g thereof was formed as pellets to be submitted to the EXAFS experiment. The EXAFS radial distribution spectrum obtained by Fourier transforming vibration part extracted from the obtained spectrum is shown respectively in FIGS. 10-13. FIG. 12 shows a catalyst before the reaction and FIG. 13 shows a catalyst after the reaction. For comparison, there is shown in these drawings an EXAFS radial distribution spectrum observed using Pd foil (FIG. 10) and PdO powder (FIG. 11) as standard materials. It is easily understood by comparing these spectrum that palladium exists in the catalyst as oxide (PdO) before reaction and as Pd metallic particles after reaction. Furthermore, it can be observed that palladium exists as Pd metallic particles and exhibits the catalyst function during reaction since supply of reaction gas is stopped after reaction and cooled to the room temperature in an inert N2 gas flow to use as a sample for EXAFS.

A second embodiment of the present invention will be described with reference to drawings.

Figure 14:
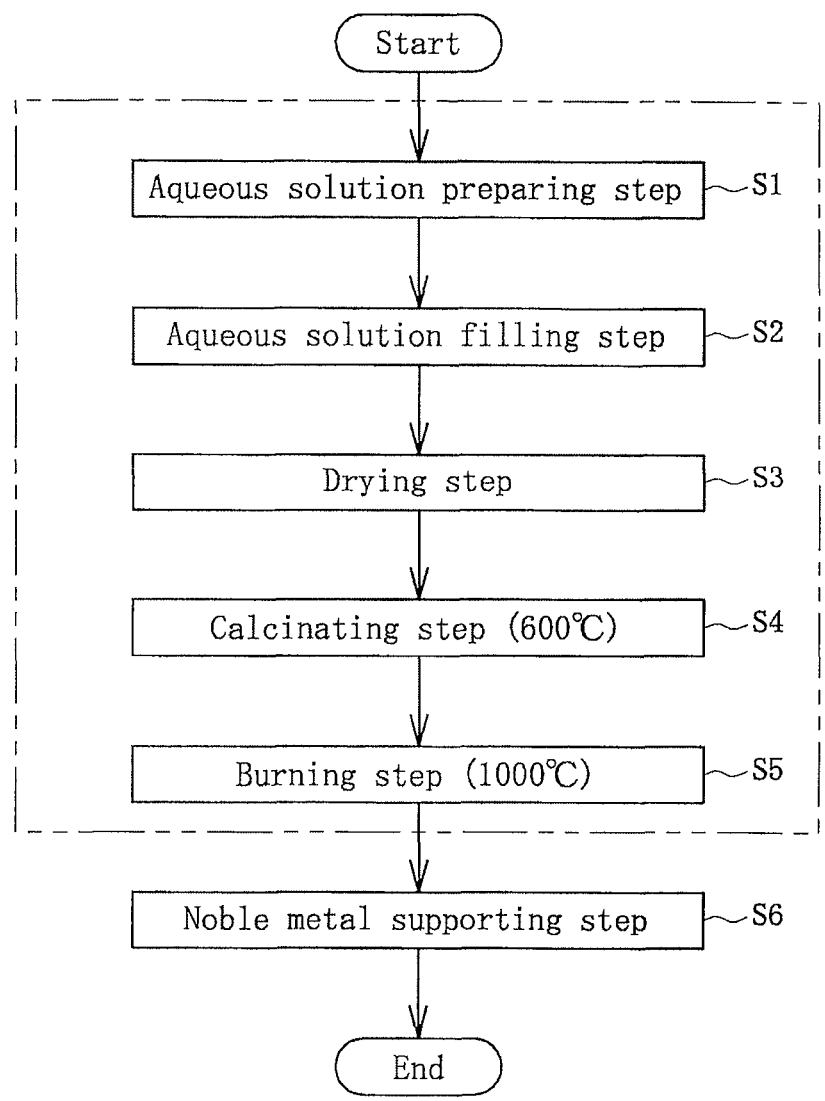
FIG. 14 is a flow chart showing a method for producing a catalyst support according to a second embodiment of the present invention.

The catalyst support according to a second embodiment of the present invention comprises porous alumina formed with pores within which magneto-plumbite-type complex oxide ((La(Mn$_x$.M$_{1-x}$)Al$_{11}$O$_{19}$ (where M is Co, Cu, or Nb)) (i.e. MPB) is formed and on which a noble metal such as palladium (Pd) is supported. As shown in FIG. 14, the catalyst support is produced through a series of production steps, such as an aqueous solution preparing step S1, an aqueous solution filling step S2, a drying step S3, a calcinating step S4, and a burning step S5, and the emission purifying catalyst is produced further through a noble metal supporting step S6.

The aqueous solution preparing step S1 is a step for preparing aqueous solution containing any of cobalt (Co) ions, copper (Cu) ions, or niobium (Nb) ions in addition to lanthanum (La) ions and manganese (Mn) ions (i.e., aqueous solution containing indispensable La ions and Mn ions and selective cobalt (Co) ions, copper (Cu) ions or niobium (Nb) ions). More particularly, the aqueous solution is prepared so that the atomic ratio of aluminum (Al), lanthanum (La), manganese (Mn), cobalt (Co), copper (Cu) or niobium (Nb) i.e. the atomic ratio of Al:La:Mn:M (where M is Co, Cu, or Nb) is 11:1:x:1-x (where x is defined as a value 0<x<1). Preferably, the lanthanum salt is an aqueous solution salt of lanthanum nitrate, lanthanum acetate, lanthanum lactate etc. The manganese salt is an aqueous solution salt of manganese nitrate, manganese acetate, manganese lactate, etc. This is similar in case of the cobalt salt and the copper salt also. As to the niobium salt, it is preferable to use aqueous solution of hydrochloric acid of niobium pentachloride.

The aqueous solution filling step S2 is a step for filling the pores of porous alumina with the aqueous solution obtained in the aqueous solution preparing step S1 by a pore-filling method using the capillarity caused in the pores. The pore-filling method is a method in which a volume of the pores of the alumina support (catalyst support) is measured and the aqueous solution obtained in the aqueous solution preparing step S1 of same amount as the measured volume of the pores is filled in the pores of the alumina support by mingling and stirring the aqueous solution utilizing the capillarity.

The drying step S3 is a step for drying the porous alumina of which pores are filled with aqueous solution in the aqueous solution filling step S2. Thus the walls of pores of the catalyst support are coated by components for forming the magneto-plumbite type complex oxide (MPB). The calcinating step S4 is a step for calcinating the catalyst support dried in the drying step S3 e.g. at about 600° C. The burning step S5 is a step for further burning the porous alumina obtained in the drying step S3 and calcinated in the step S4 in atmosphere at about 1000° C. to form the magneto-plumbite type complex oxide. The burning duration is 60 hours or more.

The catalyst support of the present embodiment can be produced by performing the steps S1-S5 and then the catalyst for purifying emission is produced by performing the noble metal supporting step S6 in which a noble metal (e.g. palladium) is supported on the magneto-plumbite-type complex oxide. The noble metal supporting step S6 is a step in which the pores of the catalyst support burnt in the burning step S5 is filled with the aqueous solution containing the noble metal (e.g. palladium) by the pore-filling method using the capillarity caused in the pores. Thus, the catalyst of the present invention can be produced.

The aqueous solution containing palladium (Pd) to be filled by the pore-filling method, preferably, is nitric acid aqueous solution of dinitro-diamine palladium salt or palladium nitrate. It is possible to produce a palladium catalyst supporting magneto-plumbite type complex oxide $(La(Mn.M_{1-x})Al_{11}O_{19}$ (where M is Co, Cu or Nb)) by filling said nitric acid aqueous solution of dinitro-diamine palladium salt or palladium nitrate and then by burning at 600° C. for 4 hours. For reducing the manufacturing cost of the catalyst, it is preferable to use palladium as the noble metal as in the present embodiment, however other noble metals such as platinum (Pt), rhodium (Rh), etc. may be used in place of palladium.

According to the producing method of the catalyst support and the catalyst above, since the pores of porous alumina are filled with the aqueous solution obtained in the aqueous solution preparing step by a pore-filling method and the magneto-plumbite type complex oxide is precipitated in the pores by drying the porous alumina, it is possible to more easily obtain the catalyst support which can maintain the purifying ability for HC, CO, and NO even after being exposed to a high temperature atmosphere e.g. about 1000° C. for a long term.

In addition, it is possible to more easily obtain the catalyst support and catalyst which can improve the low temperature combustion activity of HC and CO and the NO purifying ability under the lean combustion condition by using the magneto-plumbite-type complex oxide $(La(Mn.M_{1-x})Al_{11}O_{19}$ (where M is Co, Cu, or Nb)) (i.e. MPB) formed by adding any of Co, Cu, or Nb to $(La.Mn)Al_{11}O_{19}$.

Then results of experiments showing concrete characteristics of the present invention will be described with reference to embodiment.

(Experiment 16): Measurement of Values of Physical Properties of Alumina

The specific surface area, pore volume and average pore diameter before and after the durability test of 1000° C. for 60 hours as to commercially available alumina were measured by the nitrogen adsorbing BET (Brunauer-Emmerit-Teller) method and the results are shown in Table 14. It was confirmed that the specific surface area of alumina was reduced from 201.5 to 119.3 (m$^2$/g) and the pore volume was reduced from 0.78 to 0.61 (ml/g).

(Experiment 17): Production of $La(Mn_{0.5}Co_{0.5})Al_{11}O_{19}$ Having a Magneto-Plumbite (MPB) Structure After having dissolved lanthanum nitrate $(La(NO_3)_3 \cdot 6H_2O)$ of 3.77 g, manganese acetate $(Mn (CH_3CO_2)_2 \cdot 4H_2O)$ of 0.79 g and cobalt nitrate $(Co (NO_3)_2 \cdot 6H_2O)$ of 1.25 g into distilled water of 3.8 ml. Then after having added this solution into alumina powder of 4.9 g and mingled them each other, the pores of alumina powder (pore volume was 3.8 ml) were filled with the mingled aqueous solution by the pore-filling method.

Then after having dried this powder at 110° C. for 12 hours and calcinated at 600° C. for 4 hours, the powder was burnt at 1000° C. for 60 hours to produce $La(Mn_{0.5}Co_{0.5})Al_{11}O_{19}$ having a magneto-plumbite (MPB) structure. The specific surface area, pore volume, and average pore diameter of this material were measured similarly to Experiment 16 and shown in Table 14. From Table 14, it is found that the pore volume is reduced from 0.61 to 0.28 ml/g as compared with a case in which only alumina powder was burnt at 1000° C. for 60 hours. This suggests that micro crystals, such as chemical compounds including La ions, Mn ions, Co ions and Al ions, e.g., $La(Mn_{0.5}Co_{0.5})Al_{11}O_{19}$ is formed in alumina pores.

(Experiment 18) Observation Using XRD

Figure 15:
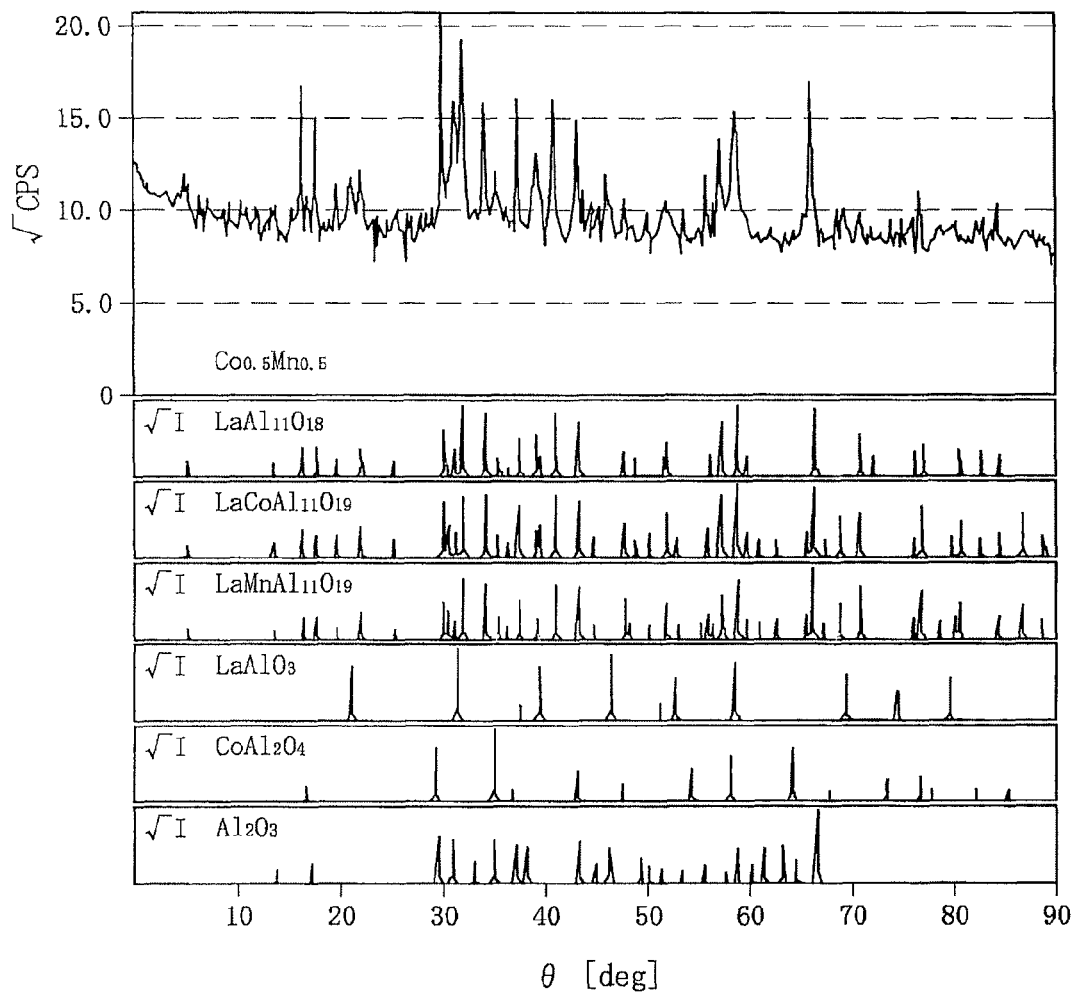
FIG. 15 is a graph showing a XRD diffraction pattern of a material produced in Experiment 17.

The XRD observation was carried out to show the material produced in Experiment 17 is $La(Mn_{0.5}Co_{0.5})Al_{11}O_{19}$. The results are shown in FIG. 15. As shown in FIG. 15, the material produced in Experiment 17 is very similar to the XRD pattern of $LaMnAl_{11}O_{19}$ or $LaCoAl_{11}O_{19}$ having a same magneto-plumbite (MPB) structure and thus it is supposed that the material produced in Experiment 17 has the magneto-plumbite structure.

However since the XRD pattern of $La(Mn_{0.5}Co_{0.5})Al_{11}O_{19}$ has not been reported yet, it is impossible to directly prove only by the XRD observation that the material produced in Experiment 17 is $La(Mn_{0.5}Co_{0.5})Al_{11}O_{19}$. However, from the fact that there are no peaks, in the XRD pattern shown in FIG. 15, peculiar to Mn oxides such as $Mn_2O_3$ and $MnO_2$, and to cobalt oxides such as CoO and $Co_3O_4$ or aluminate compounds such as $CoAl_2O_4$, it is possible to suppose that Mn ions and Co ions are taken in the magneto-plumbite structure and thus form $La(Mn_{0.5}Co_{0.5})Al_{11}O_{19}$. In addition, since there are peaks peculiar to $LaAlO_3$ it is also confirmed that the perovskite compound $(LaAlO_3)$ is included as an impurity.

(Experiment 19): Evaluation of Catalyst Activity of $La(Mn_{0.5}Co_{0.5})Al_{11}O_{19}$ After having pressed the $La(Mn_{0.5}Co_{0.5})Al_{11}O_{19}$ prepared in Experiment 17 to pellets and then ground them to powder of 0.25-1.0 mm, the purifying activity was evaluated using powder of 0.5 ml (corresponding to about 0.30 g). Composition of simulated gas used in the activity evaluation was NO: 1000 ppm, CO: 0.80%, $C_3H_8$: 500 ppm, and $O_2$: 0.70%, and the gas flow rate was set at 1 l/min (corresponding to 120,000 hr$^{-1}$ as a space velocity) by using nitrogen as balancing gas.

The catalyst activity was evaluated by increasing the temperature of the catalyst layer from its room temperature to 600° C. at a rate of 5° C./min and by measuring the gas composition at an inlet and an outlet of the catalyst layer at

TABLE 14

Figure 16:
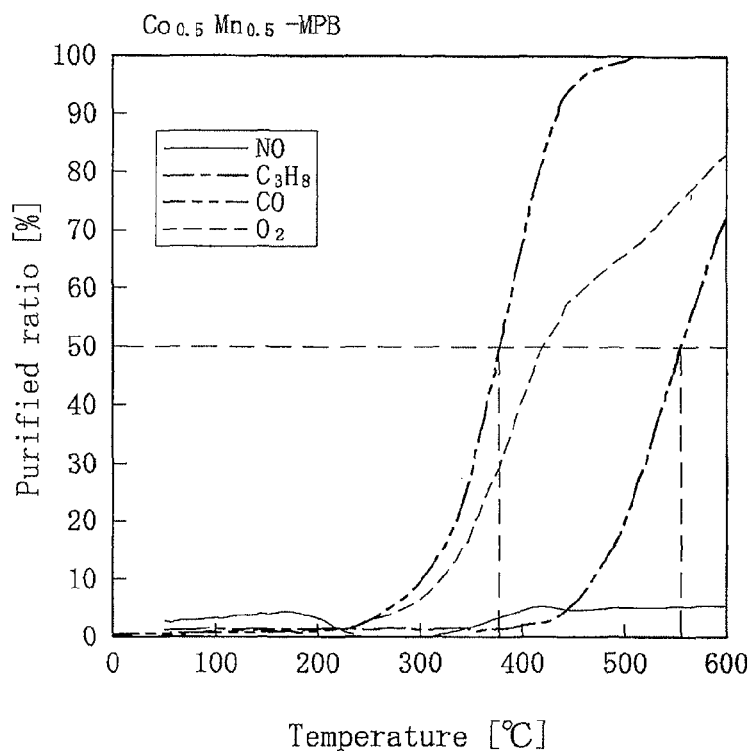
FIG. 16 is a graph showing a catalyst activity of $La(Mn_{0.5}Co_{0.5})Al_{11}O_{19}$.

| | Specific surface area [m$^2$/g] | Pore volume [ml/g] | Average pore diameter [nm] |
|---|---|---|---|
| Commercially available alumina | 201.5 | 0.78 | 13.0 |
| Alumina after heat treatment at 1000° C. for 60 hours | 119.3 | 0.61 | 19.8 |
| Produced La $(Mn_{0.5}Co_{0.5}) Al_{11}O_{19}$ | 51.5 | 0.28 | 28.4 | each temperature by using the infrared spectroscopy and the magnetic oxygen analyzing method. The simulated gas used in the activity evaluation contains more amount of oxygen than that necessary for perfectly oxidizing reducing gases, such as CO and $C_3H_8$ etc. and thus, corresponds to lean emission gas. The behavior of the catalyst activity obtained in this experiment is shown in FIG. 16. It can be appreciated from FIG. 16 that sufficient purified ratio for NO, CO, and HC can not be obtained only by $La(Mn_{0.5}Co_{0.5})Al_{11}O_{19}$ and thus it is still insufficient for practical use.

(Experiment 20): Distribution of Palladium on Powder of $La(Mn_{0.5}Co_{0.5})Al_{11}O_{19}$ The powder of $La(Mn_{0.5}Co_{0.5})Al_{11}O_{19}$ of 3.0 g obtained in Experiment 17 was weighed and its pores were filled with Pd.dinitro-diamine aqueous solution of 0.9 ml by the pore-filling method. Although the commercially available Pd.dinitro-diamine aqueous solution used in this experiment contained 4.6 wt % palladium, the Pd.dinitro-diamine aqueous solution of 1.9 ml (including Pd of 0.09 g) was condensed to 0.9 ml on a water bath and was used for the pore-filling.

Figure 17:
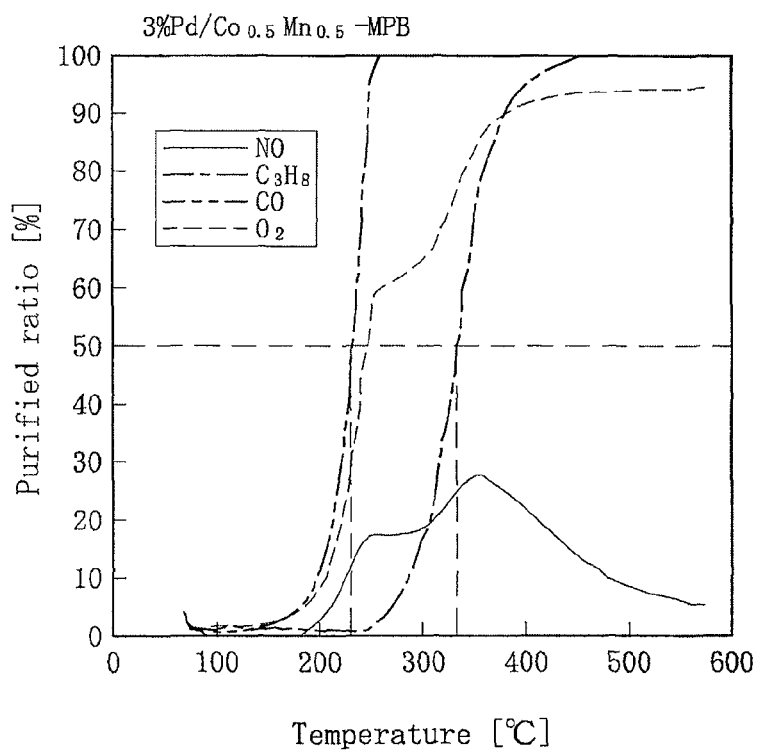
FIG. 17 is a graph showing a catalyst activity of 3% Pd/La$(Mn_{0.5}Co_{0.5})Al_{11}O_{19}$.

After having dried the pore-filled powder at 110° C. for 12 hours, it was burnt at 600° C. for 4 hours to obtain 3% palladium catalyst supporting $La(Mn_{0.5}Co_{0.5})Al_{11}O_{19}$. The catalyst (3% $Pd/La(Mn_{0.5}Co_{0.5})Al_{11}O_{19}$) activity was evaluated similar to Experiment 19 and its results are shown in FIG. 17. Temperatures required for reducing by half hydrocarbon (HC) and carbon monoxide (CO) were defined respectively as T (50) HC and T (50) CO and values of them were used as indexes of catalyst activity evaluation.

(Experiment 21): Production of 3% $Pd/La(Mn_{1-x}Co_x)Al_{11}O_{19}$ Catalyst and Evaluation of its Activity Magneto-plumbite type material $(La(Mn_{1-x}Co_x)Al_{11}O_{19})$ was produced in which a ratio of an amount of Mn and an amount of Co is varied similarly to Experiment 17 using an amount of manganese acetate and an amount of cobalt nitrate shown in Table 15. Then 3% $Pd/La(Mn_{1-x}Co_x)Al_{11}O_{19}$ catalyst was produced using the material $(La(Mn_{1-x}Co_x)Al_{11}O_{19})$ as a support after having distributed Pd thereon and burnt at 600° C. for 4 hours similarly to Experiment 20.

TABLE 15

Production of magneto-plumbite type material $(La(Mn_{1-x}Co_x)Al_{11}O_{19})$ with varying Co ratio

|  | Alumina [g] | Lanthanum nitrate [g] | Manganese acetate [g] | Cobalt nitrate [g] |
|---|---|---|---|---|
| (La•Mn) $Al_{11}O_{19}$ | 4.9 | 3.68 | 1.58 | 0.00 |
| La $(Mn_{0.9}Co_{0.1}) Al_{11}O_{19}$ | 4.9 | 3.68 | 1.43 | 0.25 |
| La $(Mn_{0.7}Co_{0.3}) Al_{11}O_{19}$ | 4.9 | 3.68 | 1.11 | 0.75 |
| La $(Mn_{0.5}Co_{0.5}) Al_{11}O_{19}$ | 4.9 | 3.68 | 0.79 | 1.35 |
| La $(Mn_{0.3}Co_{0.7}) Al_{11}O_{19}$ | 4.9 | 3.68 | 0.47 | 1.75 |
| La $(Mn_{0.1}Co_{0.9}) Al_{11}O_{19}$ | 4.9 | 3.68 | 0.15 | 2.25 |
| (La•Co) $Al_{11}O_{19}$ | 4.9 | 3.68 | 0.00 | 2.70 |

Figure 18:
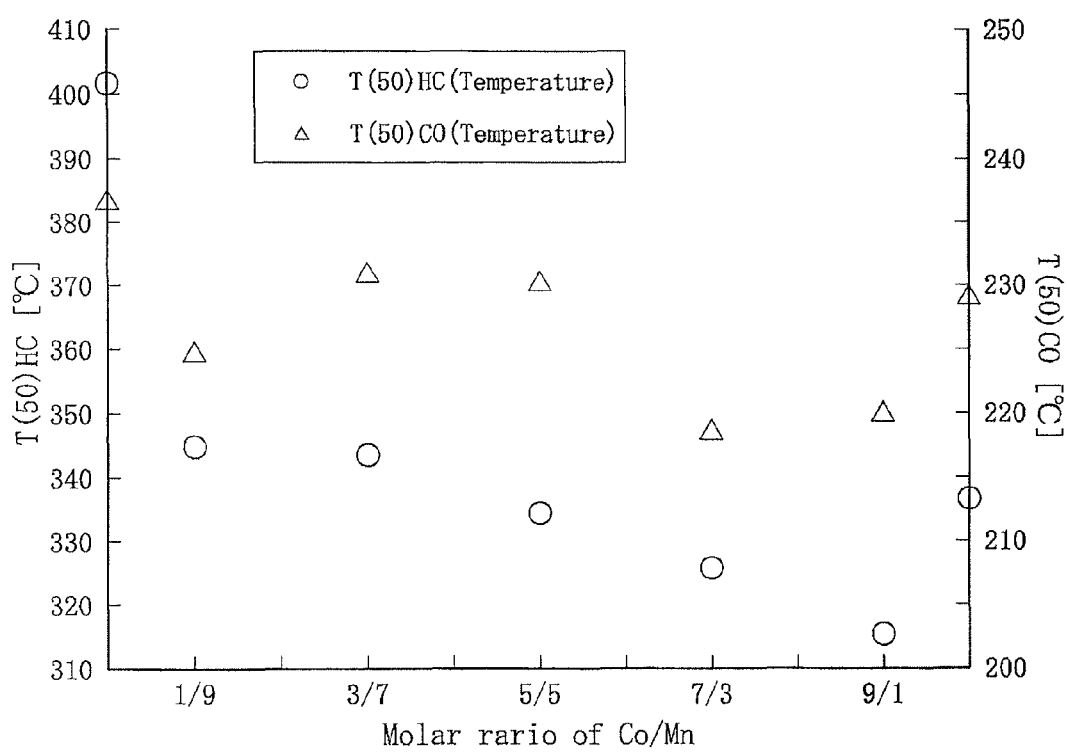
FIG. 18 is a graph showing an activity evaluation of 3% Pd/La$(Mn_{1-x}Co_x)Al_{11}O_{19}$.

The catalyst activity was evaluated as to these catalysts by measuring the activity similarly to Experiment 19 and using T (50) HC and T (50) CO. The results are shown in Table 16 and FIG. 18. The purified ratios of CO, HC and NO at 350° C. are also shown in FIG. 16. From the Table 16 and FIG. 18 it is found that the catalyst exhibits the most excellent activity when x=0.9, i.e., 3% $Pd/La(Mn_{0.1}Co_{0.9})Al_{11}O_{19}$. Accordingly, 3% $Pd/La(Mn_{0.1}Co_{0.9})Al_{11}O_{19}$ will be used in subsequent experiments.

TABLE 16

| Name of catalyst | T (50) HC [° C.] | T (50) CO [° C.] | Activity at 350° C. | | |
|---|---|---|---|---|---|
|  |  |  | ΔCO % | ΔHC % | ΔNO % |
| 3% Pd/(La•Mn) $Al_{11}O_{19}$ | 402 | 237 | 100 | 24.0 | 17.5 |
| 3% Pd/La $(Mn_{0.9}Co_{0.1}) Al_{11}O_{19}$ | 345 | 225 | 100 | 55.0 | 22.3 |
| 3% Pd/La $(Mn_{0.7}Co_{0.3}) Al_{11}O_{19}$ | 344 | 232 | 100 | 56.4 | 21.4 |
| 3% Pd/La $(Mn_{0.5}Co_{0.5}) Al_{11}O_{19}$ | 333 | 231 | 100 | 73.0 | 27.4 |
| 3% Pd/La $(Mn_{0.3}Co_{0.7}) Al_{11}O_{19}$ | 324 | 219 | 100 | 78.0 | 26.6 |
| 3% Pd/La $(Mn_{0.1}Co_{0.9}) Al_{11}O_{19}$ | 316 | 220 | 100 | 84.0 | 26.0 |
| 3% Pd/(La•Co) $Al_{11}O_{19}$ | 338 | 229 | 100 | 20.5 | 26.6 |

Experiment 22 Variation of Catalyst Activity According to Variation of Oxygen Concentration in Emission Gas The oxygen concentration of emission gas used in Experiment 19 is 0.70% and thus is a lean emission gas. Accordingly, the catalyst activity was measured by changing the oxygen concentration to 0.65% (stoichiometric) and 0.62% (rich) with keeping concentrations of CO, $C_3H_8$ and NO as they were. The 3% $Pd/La(Mn_{0.1}Co_{0.9})Al_{11}O_{19}$ was used as a catalyst here which exhibited the most excellent activity in Experiment 21.

Figure 19:
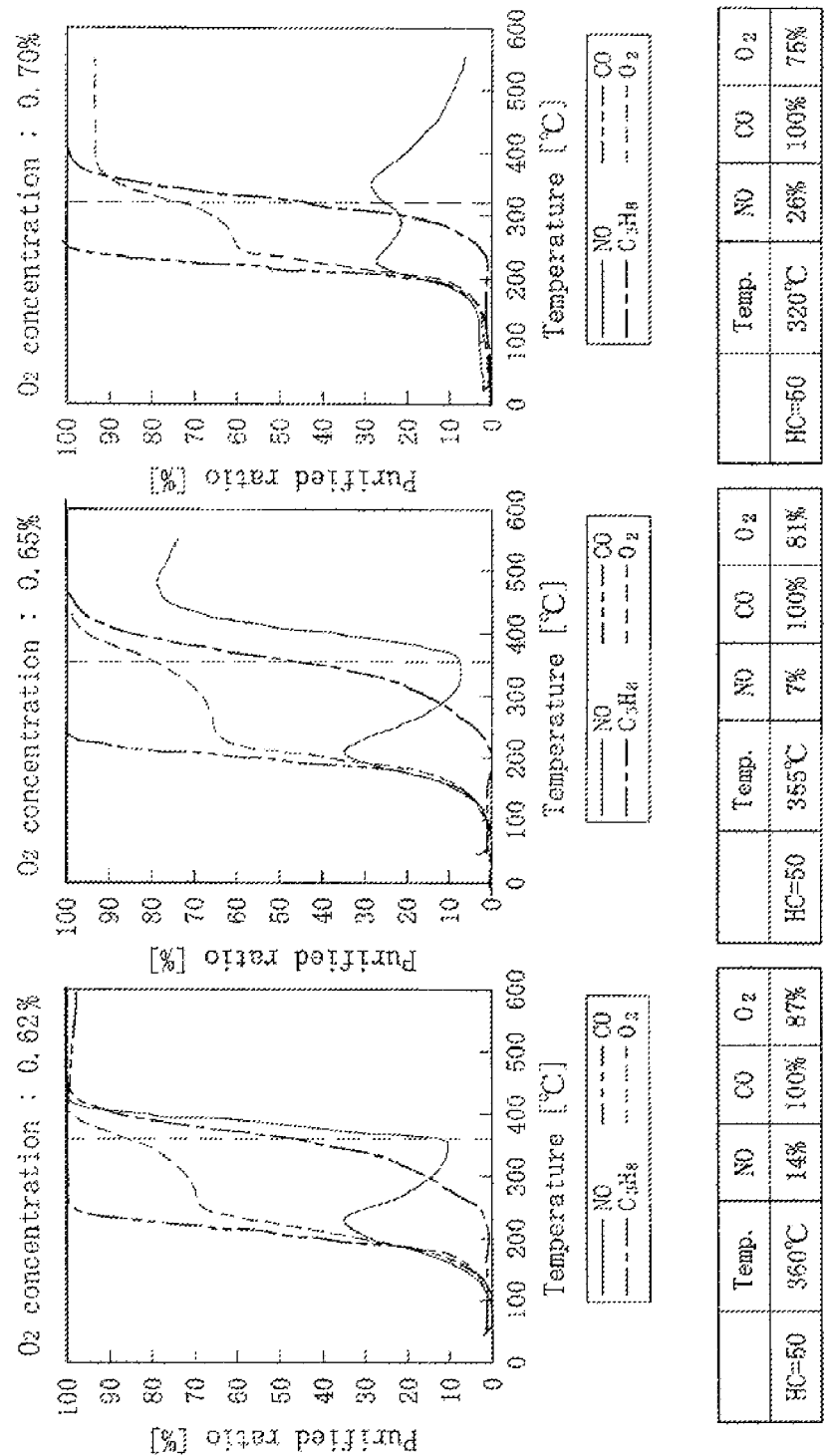
FIG. 19 is a graph showing a catalyst activity under a rich, stoichiometric and lean combustion conditions.
Figure 20:
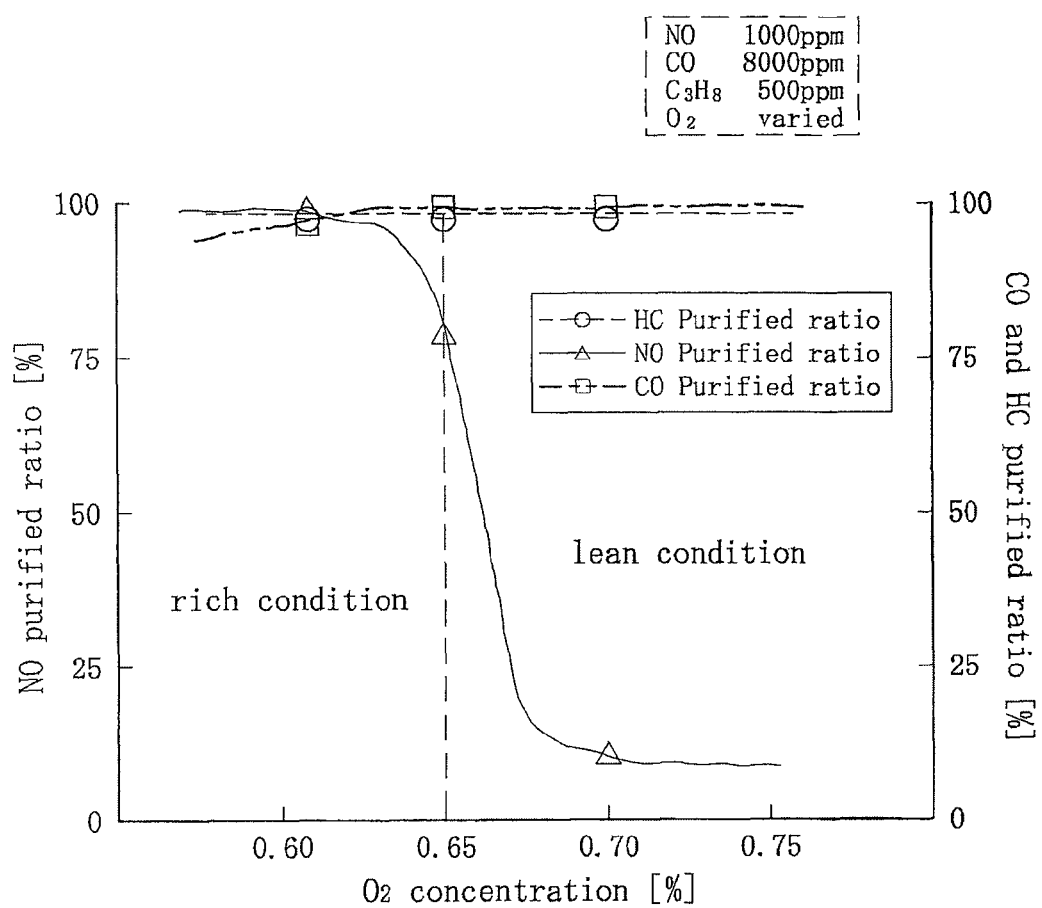
FIG. 20 is a graph showing a change of a catalyst activity according to a change of oxygen concentration in emission gas.

Results under stoichiometric and rich combustion conditions are shown in FIG. 19 together with a result under a lean combustion condition. As to NO purification, it is found that main part of it is a reducing reaction by CO at a low temperature (near 350° C.) under the lean combustion condition. On the other hand, a reducing reaction by HC at a high temperature region (near 450° C.) is promoted under the stoichiometric and rich combustion conditions and NO purified ratio also exceeds 90%. Relations between the purifying activity of NO, CO, and HC at 500° C. and the $O_2$ concentration in emission gas are shown in FIG. 20.

(Experiment 23): Heat Resistance Test of the 3% $Pd/La(Mn_{0.1}Co_{0.9})Al_{11}O_{19}$ Catalyst at 800° C.

Although only a catalyst burnt at 600° C. for 4 hours is used in experiments above, the heat resistance in this experiment was evaluated using 3% $Pd/La(Mn_{0.1}Co_{0.9})Al_{11}O_{19}$ catalysts burnt at 800° C. respectively for 20, 40, and 100 hours. Similar to Experiment 19, this experiment was carried out under the lean combustion condition ($O_2$ concentration: 0.70%) and respective T (50) CO and T (50) HC were observed.

Figure 21:
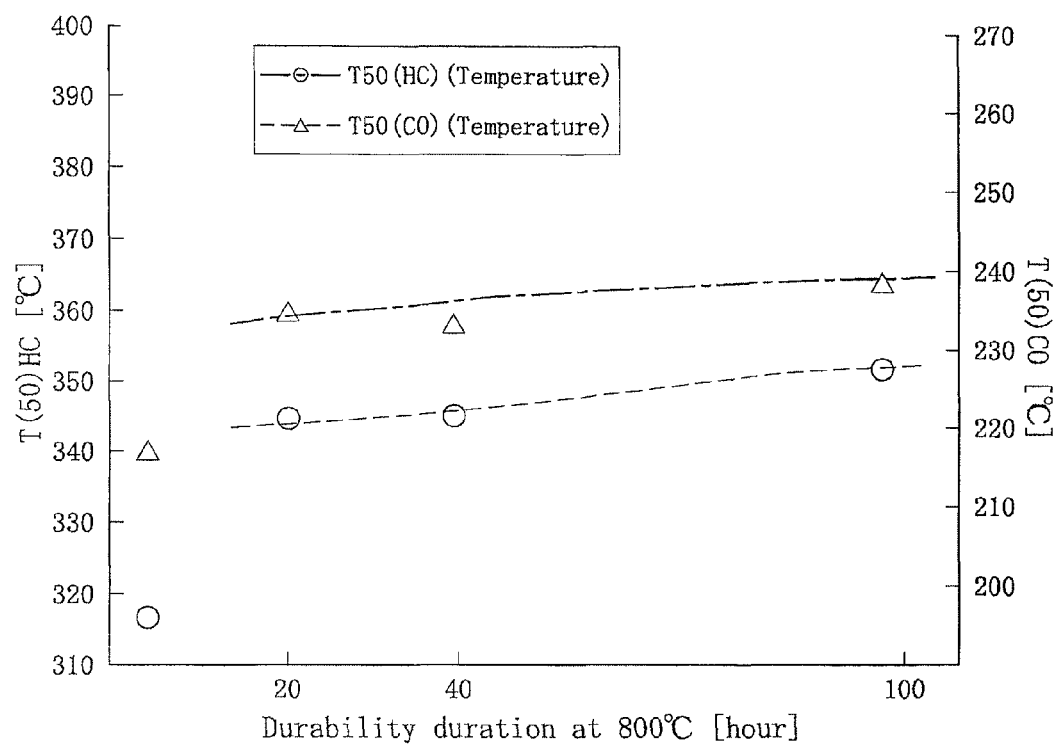
FIG. 21 is a graph showing a result of a durability test of 3% Pd/La$(Mn_{0.1}Co_{0.9})$.MPB catalyst at 800° C.

The observed results are shown in Table 17 and FIG. 21. For comparison T (50) CO and T (50) HC of catalyst burnt at 600° C. for 4 hours are also shown in FIG. 21. Since the catalyst activity is somewhat deteriorated just after burning at 800° C., the T (50) CO and T (50) HC of catalyst slightly shift toward a high temperature side. However, substantially stable activity was obtained after 20 hour burning. That is, it was found that this catalyst has sufficient heat resistance against 800° C. burning. Since the temperature of emission gas of engines for general use and motor cycles is 500° C. at most and does scarcely exceed 800° C. even when combustion on the catalyst is proceeded, it is found that the 3% Pd/La $(Mn_{0.1}Co_{0.9})Al_{11}O_{19}$ catalyst is useful as a catalyst for purifying emission of engines for general use and motor cycles.

TABLE 17

Heat resistance test at 800° C. of 3% Pd/La $(Mn_{0.1}Co_{0.9}) Al_{11}O_{19}$ catalyst

| Burning temperature [° C.] | Burning duration [hour] | T (50) HC | T (50) CO |
|---|---|---|---|
| 600 | 4 | 316 | 220 |
| 800 | 20 | 344 | 239 |
|  | 40 | 346 | 238 |
|  | 100 | 352 | 244 |

Figure 22:
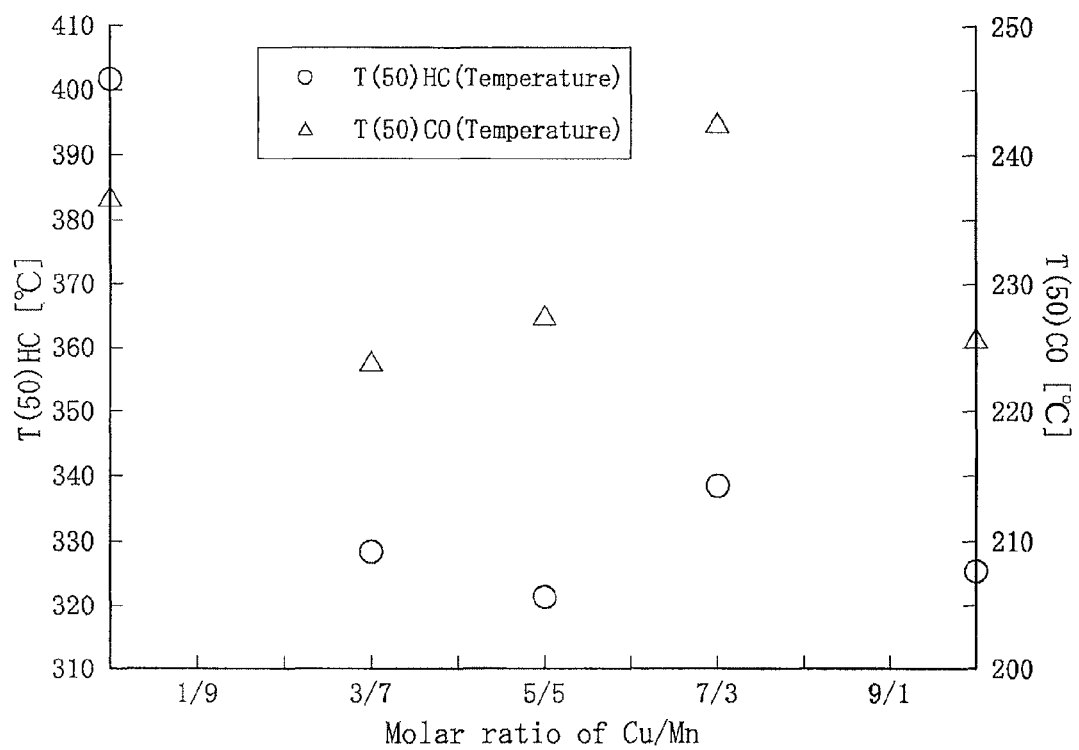
FIG. 22 is a graph showing an activity evaluation of 3% Pd/La$(Mn_{1-x}Cu_x)Al_{11}O_{19}$ catalyst.

(Experiment 24): Production of 3% Pd/La$(Mn_{1-x}Cu_x)Al_{11}O_{19}$ Catalyst and Evaluation of its Activity The La$(Mn_{1-x}Cu_x)Al_{11}O_{19}$ was prepared similarly to Experiment 20 using copper nitrate (Cu $(NO_3)_2 \cdot 6H_2O$) instead of cobalt nitrate (Co $(NO_3)_2 \cdot 6H_2O$). Then the 3% Pd/La$(Mn_{1-x}Cu_x)Al_{11}O_{19}$ catalyst was prepared using the La$(Mn_{1-x}Cu_x)Al_{11}O_{19}$ as a catalyst support in accordance with the method of Experiment 20 and its catalyst activity was measured using the simulated gas in Experiment 19. The results of which are shown in the Table 18 and FIG. 22. From the Table 18 and FIG. 22, it is found that the 3% Pd/La$(Mn_{1-x}Cu_x)Al_{11}O_{19}$ catalyst exhibits most excellent catalyst activity when x=0.5.

TABLE 18

Evaluation of activity of 3% Pd/La $(Mn_{1-x} Cu_x) Al_{11}O_{19}$ catalyst

| Name of catalyst | T (50) HC [° C.] | T (50) CO [° C.] | Activity at 350° C. ΔCO % | ΔHC % | ΔNO % |
|---|---|---|---|---|---|
| 3% Pd/(La•Mn) $Al_{11}O_{19}$ | 402 | 237 | 100 | 24 | 18 |
| 3% Pd/La $(Mn_{0.7}Cu_{0.3}) Al_{11}O_{19}$ | 328 | 224 | 100 | 76 | 19 |
| 3% Pd/La $(Mn_{0.5}Cu_{0.5}) Al_{11}O_{19}$ | 321 | 228 | 100 | 87 | 19 |

TABLE 18-continued

Evaluation of activity of 3% Pd/La $(Mn_{1-x} Cu_x) Al_{11}O_{19}$ catalyst

| Name of catalyst | T (50) HC [° C.] | T (50) CO [° C.] | Activity at 350° C. ΔCO % | ΔHC % | ΔNO % |
|---|---|---|---|---|---|
| 3% Pd/La $(Mn_{0.3}Cu_{0.7}) Al_{11}O_{19}$ | 339 | 243 | 100 | 60 | 16 |
| 3% Pd/(La•Cu) $Al_{11}O_{19}$ | 325 | 226 | 100 | 81 | 18 |

(Experiment 25): Production of 3% Pd/La$(Mn_{0.1} \cdot Nb_{0.9})Al_{11}O_{19}$ Catalyst and Evaluation of its Activity La$(Mn_{0.1} \cdot Nb_{0.9})Al_{11}O_{19}$ was prepared by replacing a part of Mn with Nb. In the preparation of the La$(Mn_{0.1} \cdot Nb_{0.9})Al_{11}O_{19}$, lanthanum nitrate of 3.77 g was dissolved into distilled water of 2 ml. Then after having filled pores of alumina of 4.9 g, it was dried at 110° C. for 12 hours. Then using niobium pentachloride ($NbCl_5$) which can be dissolved by HCl, 2.12 g of it was dissolved into 6N.HCl of 10 ml. On the other hand manganese nitrate (Mn $(NO_3)_2 \cdot 6H_2O$) of 0.25 g was dissolved into distilled water of 1 ml and mingled with the HCl solution.

Then the mingled solution was divided to three parts and introduced into pores of the dried powder over 3 times. Firstly, the mingled solution of 4 ml is charged into the pores of dried powder and the powder was dried again at 110° C. for 12 hours. Then 4 ml of remained mingled solution was filled into the pores of the re-dried powder and dried at 110° C. for 12 hours. Then at last, 3 ml of the mingled solution was similarly filled into the pores of the three-times dried powder and dried at 110° C. for 12 hours. Then, it was burnt at 600° C. for 4 hours and then finally dried at 1000° C. for 60 hours to form the La$(Mn_{0.1} \cdot Nb_{0.9})Al_{11}O_{19}$. Although a very small amount of chlorine ions is remained in the powder, almost of them can be removed by burning at 1000° C. and thus the combustion activity of hydrocarbon or carbon monoxide will not be substantially influenced.

In the preparation of the 3% Pd/La$(Mn_{0.1} \cdot Nb_{0.9})Al_{11}O_{19}$, 3 g of La$(Mn_{0.1}Nb_{0.9})Al_{11}O_{19}$ powder prepared by the method mentioned above was weighed and the pores were filled with Pd.dinitro-diamine aqueous solution similarly to Experiment 20. After having dried at 110° C. for 12 hours, 3% Pd/La $(Mn_{0.1} \cdot Nb_{0.9})Al_{11}O_{19}$, was prepared by further burning at 1000° C. for 10 hours. The catalyst activity was evaluated using this catalyst in accordance with the method described in Experiment 19. The temperature at which hydrocarbon (propane) and carbon monoxide are reduced by half, T (50) HC and T (50) CO, are respectively 365° C. and 267° C. The purifying performance at various temperatures are shown in FIG. 19. From Table 19, it is found that HC combustion activity is good in a low temperature region below 400° C.

TABLE 19

Purifying performance of 3% Pd/La $(Mn_{0.1} \cdot Nb_{0.9})$ $Al_{11}O_{19}$ catalyst and 3% Pd/(La•Mn) $Al_{11}O_{19}$ catalyst

| Reaction temperature [° C.] | 3% Pd/La $(Mn_{0.1} \cdot Nb_{0.9}) Al_{11}O_{19}$ | | | 3% Pd/(La•Mn) $Al_{11}O_{19}$ | | |
|---|---|---|---|---|---|---|
|  | NO purified ratio [%] | CO purified ratio [%] | HC purified ratio [%] | NO purified ratio [%] | CO purified ratio [%] | HC purified ratio [%] |
| 300 | 7.6 | 92.0 | 4.7 | 11.8 | 93.0 | 1.0 |
| 350 | 10.8 | 100.0 | 37.0 | 9.9 | 100.0 | 24.0 |
| 400 | 12.0 | 100.0 | 70.0 | 10.4 | 100.0 | 59.0 |
| 450 | 9.5 | 100.0 | 82.0 | 8.2 | 100.0 | 84.6 |
| 500 | 7.4 | 100.0 | 87.0 | 4.8 | 100.0 | 93.0 |

(Experiment 26)

In Experiment 3, although a method of producing Mn.Co-MPB in which part of Mn of Mn-MPB is replaced by Co is described, it is not clear whether Mn is surely replaced by Co. It is only supposition that Co is entered into MPB crystal lattice by replacing Mn of Mn-MPB, since cobalt oxides, such as CoO and Co3O4 cannot be confirmed by XRD. Thus, it was tried to observe a structure around a Co atom using EXAFS.

Figure 23:
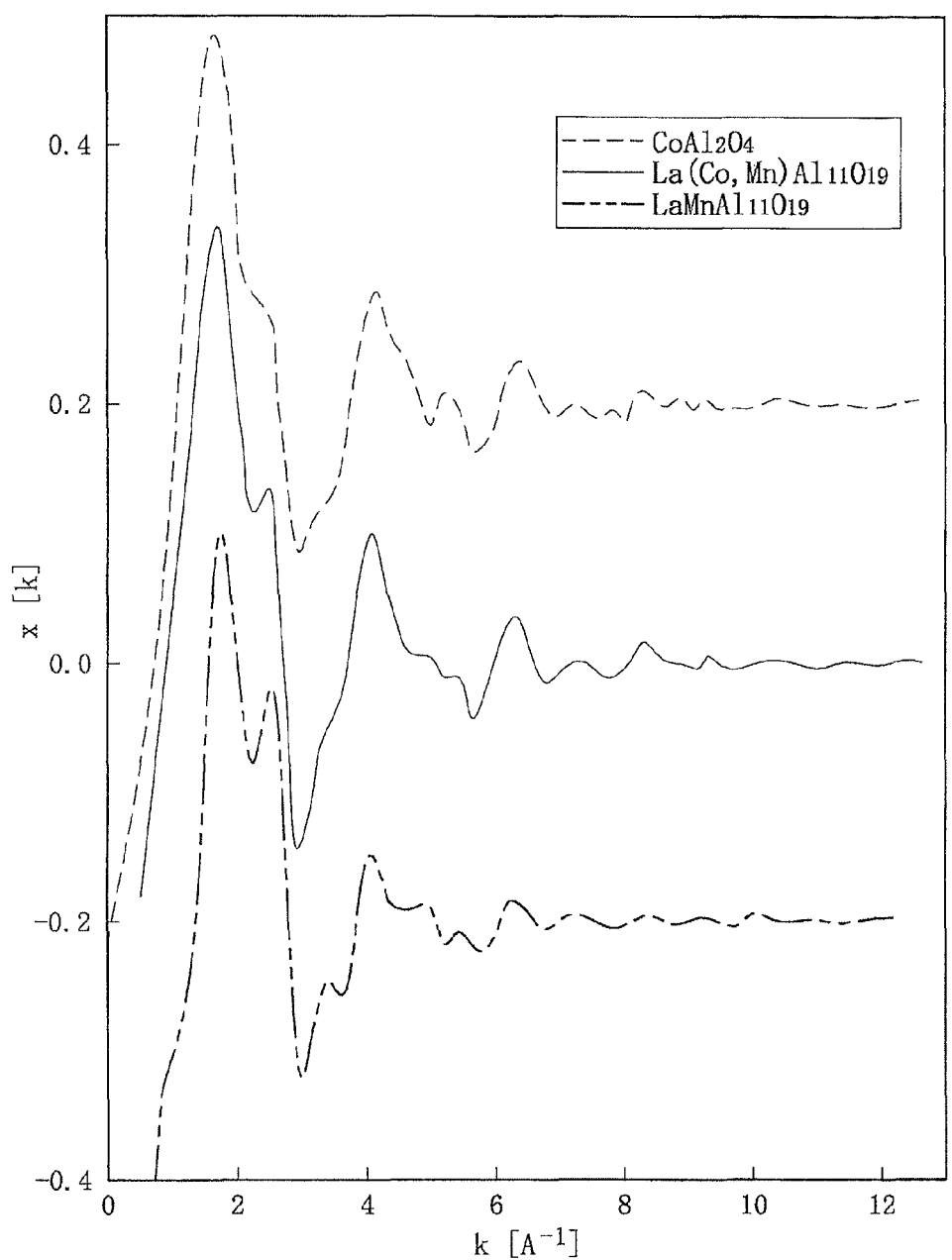
FIG. 23 is a graph showing EXAFS vibration spectrum of a MPB and Co replaced MPB.
Figure 24:
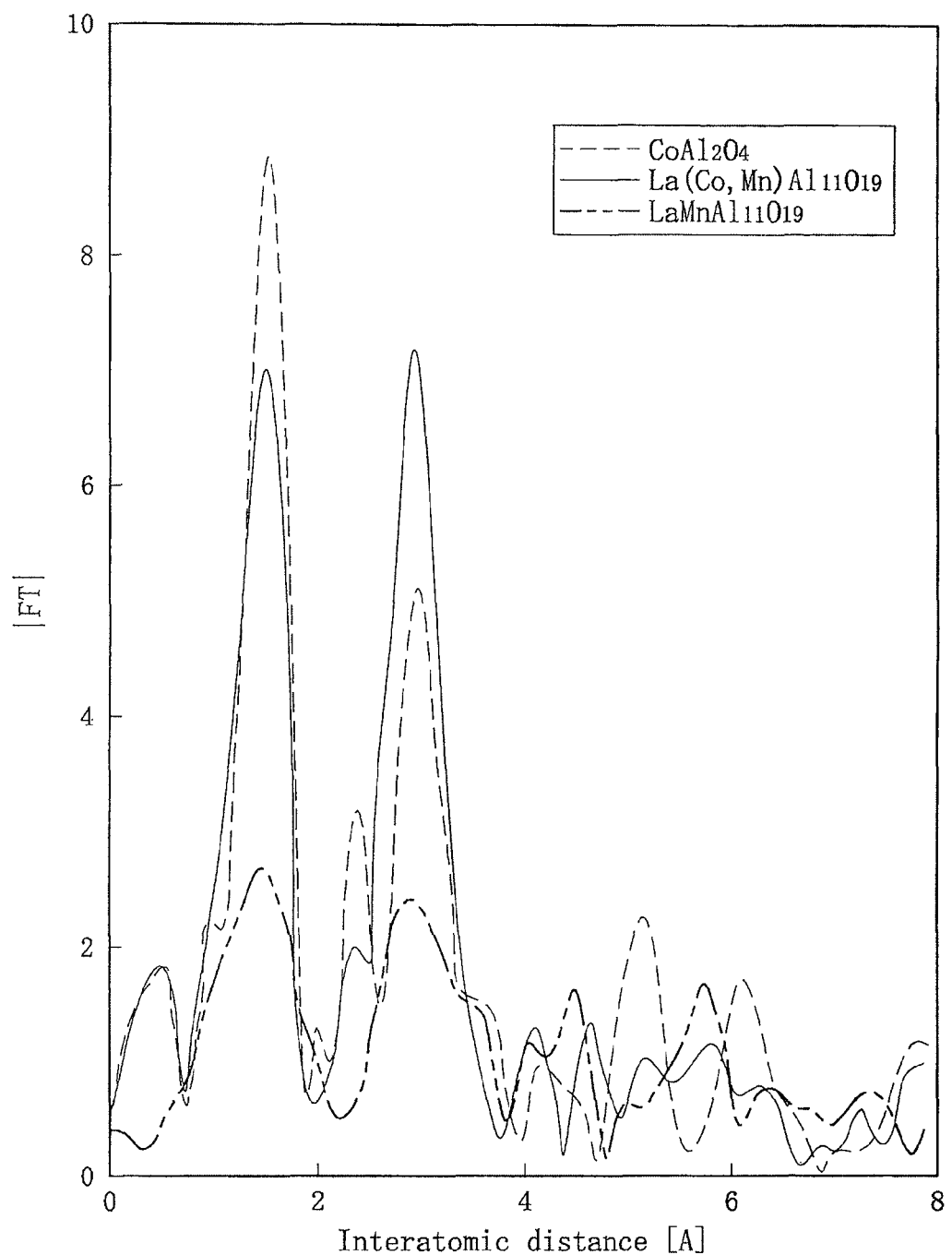
FIG. 24 is a graph showing EXAFS Fourier spectrum of a MPB and Co replaced MPB.

If Co is entered into the MPB crystal lattice with replacing Mn, the structure around Co atom should be similar to that of Mn atom of Mn-MPB. The vibration spectrum obtained from EXAFS of Mn atom and Co atom of Co.Mn-MPB powder used as a sample and the EXAFS radial distribution spectrum obtained by Fourier transforming the vibration spectrum are shown in FIGS. 23 and 24. They resemble each other and thus, it is supposed that the structure around Co atom and the structure around Mn atom are same. That is, Mn atom is surely replaced by the Co atom in the Mn.Co-MPB.

Figure 25:
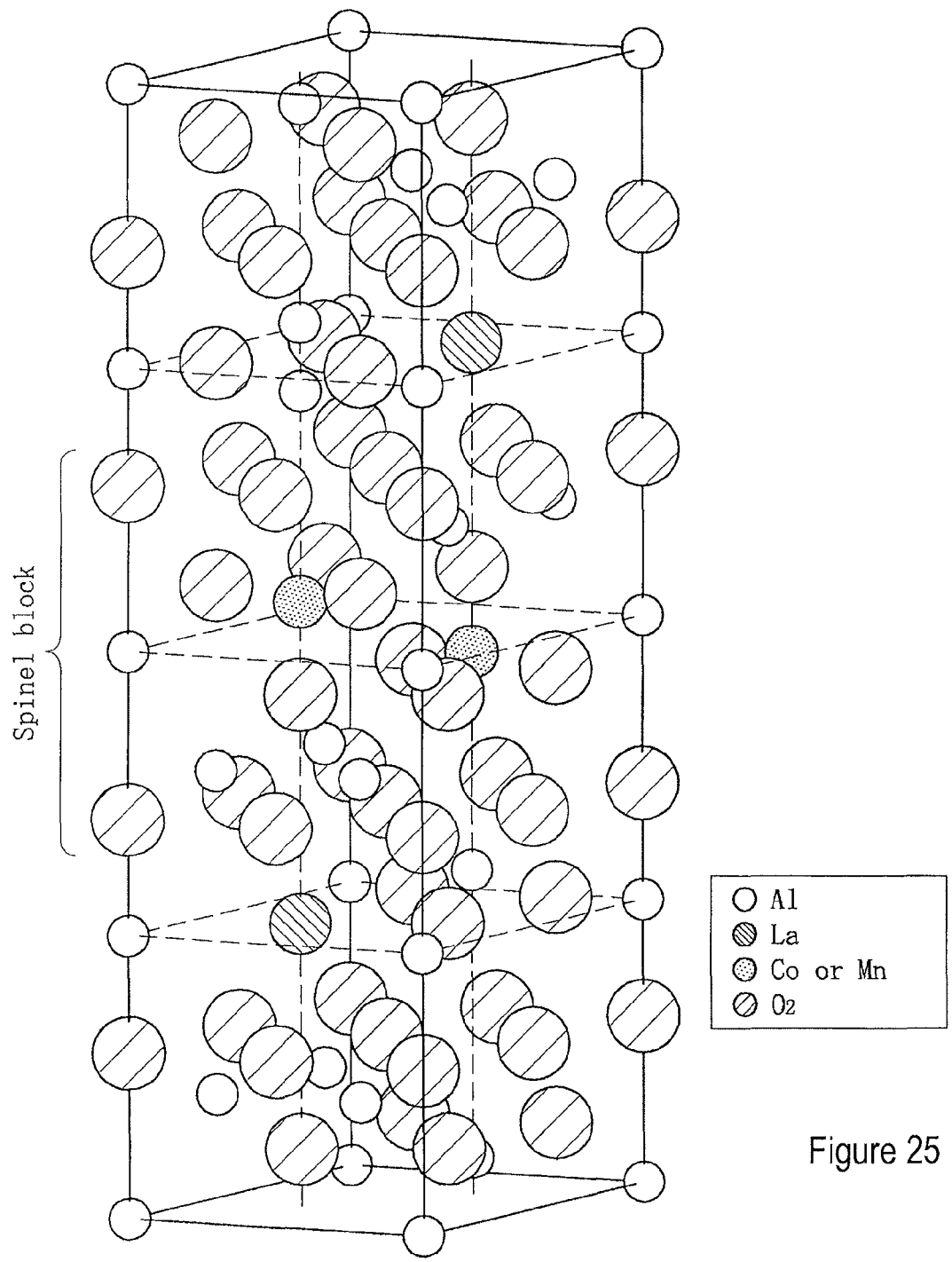
FIG. 25 is a schematic view showing positions of presence of Co and Mn in a MPB structure.

In FIGS. 23 and 24, EXAFS vibration spectrum and radial distribution spectrum relating to Co atom of cobalt aluminates (CoAl2O4) are shown for reference. A crystal structure of MPB is shown in FIG. 25. The position at which the Mn atom or Co atom can occupy in the MPB crystal is limited (i.e. a position of the so-called "spinel block)") and a spinel structure, such as CoAl2O4 is partially formed when a Co atom enters into the spinel block.

Accordingly, it is supposed that the structure around a Co atom should be same as that of a Co atom of cobalt aluminates (CoAl2O4) if Mn in Mn-MPB is replaced by a Co atom. The EXAFS vibration spectrum and radial distribution spectrum formed by a Co atom in $CoAl_2O_4$ shown in FIGS. 23 and 24 closely resemble to those formed by a Co atom in Co.Mn-MPB. From these facts, it is concluded that Mn is replaced by Co in Co.Mn-MPB and the Co forms a local structure, such as in $CoAl_2O_4$ in spinel block portion of MPB (Experiment 27)

In Experiment 25, the method for producing of (La.Nb)$Al_{11}O_{19}$ into which Nb is introduced in place of Mn and the activity evaluation of 3% Pd/(La.Nb)$Al_{11}O_{19}$ supporting Pd on the support (i.e. (La.Nb)$Al_{11}O_{19}$) was described in detail. Result of an experiment of a durability of the catalyst carried out at 1000° C. will be described herein. The durability of the catalyst was evaluated under same conditions as in Experiment 19 using catalysts heat treated at 1000° C. for 10, 20, 80 and 140 hours. The results obtained are shown in FIG. 26 using T (50) HC and T (50) CO.

Figure 26:
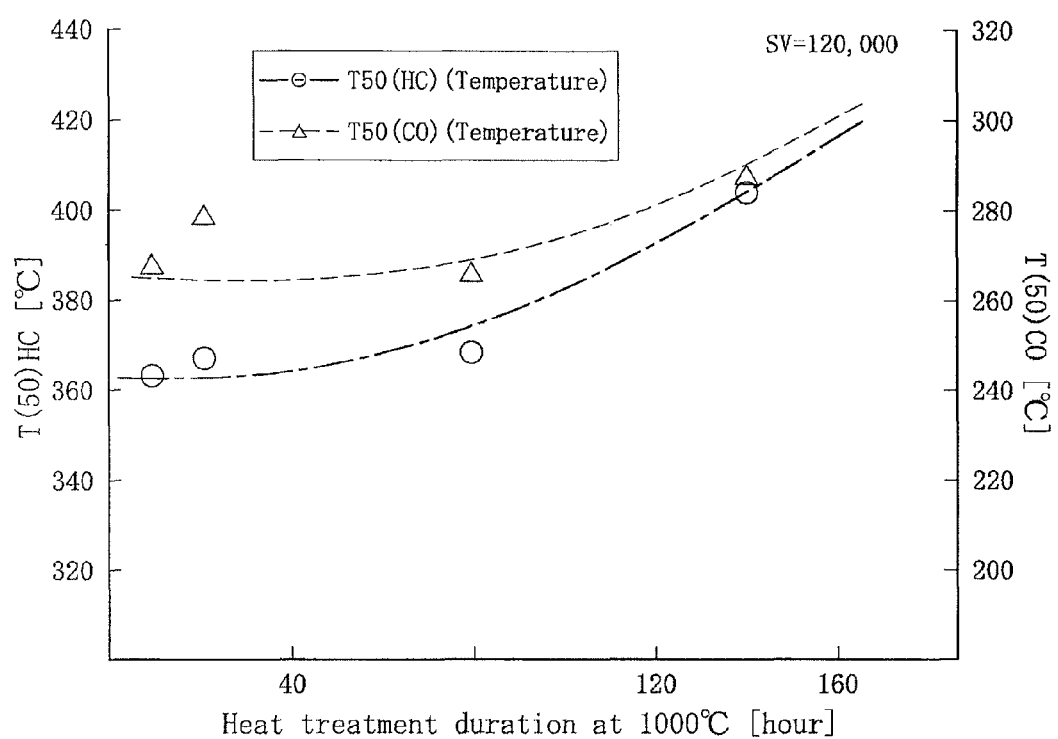
FIG. 26 is a graph showing results of a durability test of 3% Pd(La—Nb)$Al_{11}O_{19}$ at 1000° C.

FIG. 26 shows a substantially constant activity in which deterioration of activity is not found until heat treatment for 80 hours although a slight deterioration of activity is observed at the heat treatment for 140 hours. Purified ratios of HC, CO, and NO at 400° C. and 500° C. are shown in Table 20. Although the purified ratios of HC and NO at 400° C. after heat treatment at 1000° C. for 140 hours slightly deteriorate, substantial deterioration of the purified ratio is scarcely observed after heat treatment at 1000° C. for 80 hours. The purified ratio at 500° C. is substantially constant even after heat treatment for 140 hours and no deterioration of activity was observed. From these facts it can be supposed that the 3% Pd/(La.Nb)$Al_{11}O_{19}$ catalyst has sufficient heat resistance at 1000° C.

TABLE 20

Evaluation of activity of 3% Pd/(La•Nb) $Al_{11}O_{19}$ catalyst heat treated at 1000° C.

| Burning duration [hour] | Purified ratio at 400° C. | | | Purified ratio at 500° C. | | |
|---|---|---|---|---|---|---|
| | ΔCO [%] | ΔHC [%] | ΔNO [%] | ΔCO [%] | ΔHC [%] | ΔNO [%] |
| 10 | 100 | 70.1 | 11.9 | 100 | 87.4 | 7.4 |
| 20 | 100 | 59.8 | 11.4 | 100 | 82.0 | 7.2 |
| 80 | 100 | 68.2 | 11.1 | 100 | 89.3 | 7.2 |
| 140 | 100 | 44.2 | 9.1 | 100 | 84.0 | 7.1 |

The present invention can be applied to any catalyst support and any catalyst if the catalyst support and the catalyst is produced by a method comprising an aqueous solution preparing step for preparing aqueous solution containing lanthanum ions and either manganese ions or iron ions; an aqueous solution filling step for filling the pores of porous alumina with the aqueous solution obtained in the aqueous solution preparing step by a pore-filling method using the capillarity caused in the pores; a drying step for drying the porous alumina of which pores are filled with aqueous solution in the aqueous solution filling step, and a burning step for forming the magneto-plumbite type complex oxide by burning the porous alumina obtained in the drying step.

What is claimed is:

1. A catalyst support, the catalyst support comprising:
   a porous alumina structure;
   a magneto-plumbite-structure complex oxide comprising (La.M)$Al_{11}O_{19}$, wherein M is selected from Mn and Fe; and
   a noble metal supported on the magneto-plumbite-structure complex oxide;
   wherein the magneto-plumbite-structure complex oxide is formed within pores in the porous alumina structure.

2. A catalyst support of claim 1, wherein the noble metal is palladium.

3. A catalyst support of claim 1, wherein the magneto-plumbite-structure complex oxide is formed from an aqueous solution comprising lanthanum ions, aluminum ions, and one of manganese ions and iron ions.

4. A method for producing the catalyst support of claim 1, the method comprising:
   preparing an aqueous solution comprising lanthanum ions, the noble metal, and one of manganese ions and iron ions,
   filling the pores of the porous alumina structure with the aqueous solution using the capillarity caused in the pores,
   drying the porous alumina structure containing the aqueous solution, and
   heating the porous alumina structure resulting from the drying operation so as to form the magneto-plumbite-type complex oxide within the pores of the porous alumina structure.

5. A method for producing a catalyst support of claim 4, wherein the noble metal is palladium.

6. The method of claim 4, wherein the heating operation further comprises heating the alumina structure to a temperature of 1000° C. for more than 60 hours.

7. A catalyst support, comprising:
   a porous alumina structure,
   a magneto-plumbite-structure complex oxide comprising La($Mn_x.M_{1-x}$)$Al_{11}O_{19}$, wherein M is selected from Co, Cu, and Nb, a noble metal supported on the magneto-plumbite-structure complex oxide;

wherein the magneto-plumbite-structure complex oxide is formed within pores in the porous alumina structure.

8. A catalyst support of claim 7, wherein the noble metal is palladium.

9. A catalyst support of claim 7, wherein the magneto-plumbite-structure complex oxide is formed from an aqueous solution comprising lanthanum ions, aluminum ions, manganese ions and any one of cobalt ions, copper ions, or niobium ions.

10. A method for producing the catalyst support of claim 7, the method comprising:

preparing an aqueous solution comprising lanthanum ions, the noble metal, and manganese ions and any one of cobalt ions, copper ions, or niobium ions, filling the pores of the porous alumina structure with the aqueous solution using the capillarity caused in the pores, drying the porous alumina structure containing the aqueous solution, and heating the porous alumina structure resulting from the drying operation to form the magneto-plumbite type complex oxide.

11. A method for producing a catalyst support of claim 10, wherein the noble metal is palladium.

12. A method for producing a catalyst support of claim 10, wherein the heating operation further comprises heating the alumina structure to a temperature of 1000° C. for more than 60 hours.

* * * * *

UNITED STATES PATENT AND TRADEMARK OFFICE
CERTIFICATE OF CORRECTION

PATENT NO.      : 8,461,073 B2                                    Page 1 of 1
APPLICATION NO. : 12/860839
DATED           : June 11, 2013
INVENTOR(S)     : Tomoda et al.

It is certified that error appears in the above-identified patent and that said Letters Patent is hereby corrected as shown below:

Title Page

In column 2 (page 1 item 56) at line 28, Under Other Publications, change "LaMnAl11O19" to --$LaMnAl_{11}O_{19}$--.

In column 2 (page 1, item 56) at line 31, Under Other Publications, change "LaMnAl11O19" to --$LaMnAl_{11}O_{19}$--.

In the Specification

In column 17 at line 21, Change ""Fe.MPB")" to --"Fe.MPB").--.

In column 25 at line 40, Change "MPB" to --MPB.--.

Signed and Sealed this
Twenty-eighth Day of January, 2014

Michelle K. Lee
*Deputy Director of the United States Patent and Trademark Office*